United States Patent
Banin et al.

(10) Patent No.: US 12,531,583 B2
(45) Date of Patent: Jan. 20, 2026

(54) APPARATUS, SYSTEM AND METHOD OF TRANSMITTING A WIDEBAND RADIO FREQUENCY (RF) TRANSMIT (TX) SIGNAL

(71) Applicant: Intel Corporation, Santa Clara, CA (US)

(72) Inventors: Elan Banin, Raanana (IL); Assaf Ben-Bassat, Haifa (IL); Ashoke Ravi, Portland, OR (US); Rotem Banin, Even-Yehuda (IL); Ofir Degani, Nes-Ammin (IL)

(73) Assignee: INTEL CORPORATION, Santa Clara, CA (US)

( * ) Notice: Subject to any disclaimer, the term of this patent is extended or adjusted under 35 U.S.C. 154(b) by 698 days.

(21) Appl. No.: 17/710,861

(22) Filed: Mar. 31, 2022

(65) Prior Publication Data

US 2023/0318643 A1    Oct. 5, 2023

(51) Int. Cl.
*H04B 1/10* (2006.01)
*H04B 1/00* (2006.01)
*H04B 1/68* (2006.01)

(52) U.S. Cl.
CPC ............ *H04B 1/10* (2013.01); *H04B 1/0028* (2013.01); *H04B 1/005* (2013.01); *H04B 1/68* (2013.01)

(58) Field of Classification Search
CPC .... H04B 1/0475; H04B 1/525; H04B 1/1036; H04B 17/336; H04B 1/0483; H04B 1/30; H04B 17/318; H04B 1/10; H04B 1/04; H04B 1/40; H04B 7/0413; H04B 7/088; H04B 1/109; H04B 1/7087; H04B 1/71; H04B 1/711; H04B 1/715; H04B 17/18; H04B 2001/1045; H04B 2001/307; H04B 1/005; H04B 1/1027; H04B 7/08; H04B 1/0028; H04B 1/0057; H04W 24/08; H04W 52/52; H04W 72/541; H04W 24/10; H04W 72/0453; H04W 84/12; H04W 52/0209; H04W 88/02; H04W 74/0816; H04W 16/14; H04W 4/70; H04W 48/12; H04W 52/223; H04W 52/245; H04W 72/02

See application file for complete search history.

(56) References Cited

U.S. PATENT DOCUMENTS

| | | | |
|---|---|---|---|
| 9,531,410 B2 * | 12/2016 | Nagode | H04B 1/0475 |
| 2011/0243202 A1 * | 10/2011 | Lakkis | H04B 1/525 375/219 |
| 2013/0130632 A1 * | 5/2013 | Oishi | H03B 21/02 455/84 |
| 2014/0269986 A1 * | 9/2014 | Nagode | H03F 1/0222 375/296 |
| 2016/0043754 A1 * | 2/2016 | Robert | H05B 6/686 455/114.3 |
| 2018/0139078 A1 * | 5/2018 | Mittal | H03D 7/165 |
| 2024/0113696 A1 | 4/2024 | Banin et al. | |

* cited by examiner

*Primary Examiner* — Golam Sorowar
(74) *Attorney, Agent, or Firm* — Shichrur & Co.

(57) ABSTRACT

For example, a transmitter, e.g., for a wireless communication device, may be configured to transmit a wideband Radio Frequency (RF) Transmit (Tx) signal having a wide bandwidth of at least 80 Megahertz (MHz). For example, the transmitter may be configured to generate the wideband RF Tx signal having the wide bandwidth based on a baseband signal. The transmitter may be configured to generate the wideband RF Tx signal including a suppressed third harmonic and a suppressed fifth harmonic.

25 Claims, 10 Drawing Sheets

APPARATUS, SYSTEM AND METHOD OF TRANSMITTING A WIDEBAND RADIO FREQUENCY (RF) TRANSMIT (TX) SIGNAL

TECHNICAL FIELD

Aspects described herein generally relate to transmitting a wideband Radio Frequency (RF) Transmit (Tx) signal.

BACKGROUND

Wireless communication devices may be configured to communicate wireless communication signals over various signal bandwidths.

There is a need to address technical issues related to transmission of wireless communication signals, for example, to meet regulatory constraints, improve power efficiency, reduce complexity, and/or reduce cost.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
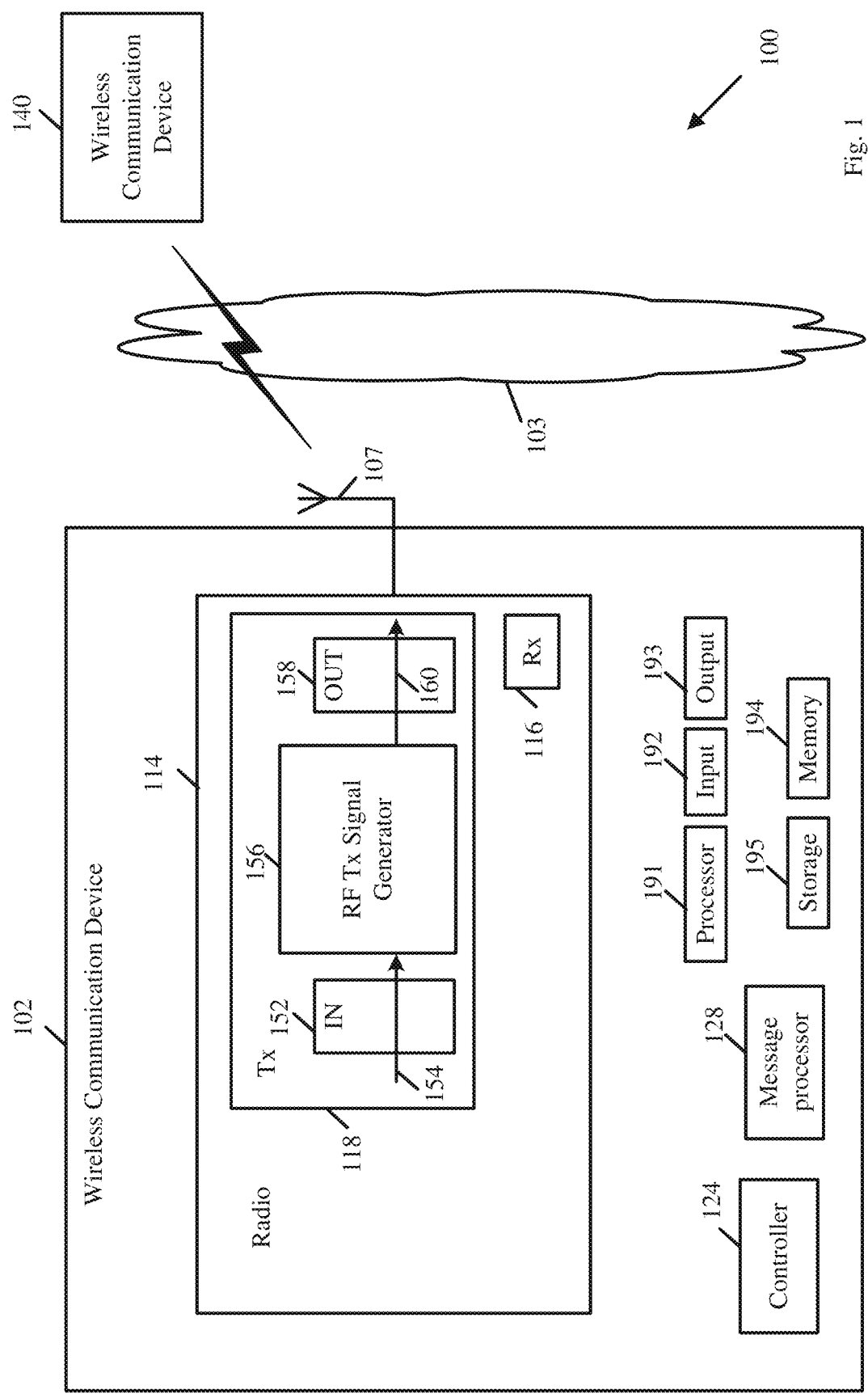
FIG. 1 is a schematic block diagram illustration of a system, in accordance with some exemplary aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (IEEE 802.11-2020, *IEEE Standard for Information Technology—Telecommunications and Information Exchange between Systems Local and Metropolitan Area Networks—Specific Requirements Part* 11: *Wireless LAN Medium Access Control (MAC) and Physical Layer (PHY) Specifications*, December 2020)), and/or future versions and/or derivatives thereof, devices and/or networks operating in accordance with existing cellular specifications and/or protocols, e.g., 3rd Generation Partnership Project (3GPP), 3GPP Long Term Evolution (LTE), Fifth Generation (5G) Specifications, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group) and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some exemplary aspects.

As shown in FIG. 1, in some demonstrative aspects, system 100 may include a wireless communication network including one or more wireless communication devices, e.g., a wireless communication device 102 and a wireless communication device 140.

In some demonstrative aspects, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a Bluetooth (BT) device, a Bluetooth Low Energy (BLE) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, operate as, and/or perform the functionality of one or more STAs. For example, device 102 may include at least one STA.

In some demonstrative aspects, device 102 may include, operate as, and/or perform the functionality of one or more WLAN STAs.

In some demonstrative aspects, device 102 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative aspects, device 102 may include a non-AP STA or an access point (AP) STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, device 102 may include, operate as, and/or perform the functionality of a BT device.

In some demonstrative aspects, device 102 may include, operate as, and/or perform the functionality of a cellular communication device.

In some demonstrative aspects, device 102 may include, operate as, and/or perform the functionality of, any other device and/or STA.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a screen, a touch-screen, a flat panel display, a Light Emitting Diode (LED) display unit, an Organic LED (OLED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a Solid State Drive (SSD), or other suitable removable or non-removable storage units. Memory unit 194 and/or storage unit 195, for example, may store data processed by device 102.

In some demonstrative aspects, wireless communication device 102 may be capable of communicating content, data, information, and/or signals via a wireless medium (WM) 103.

In some demonstrative aspects, wireless medium 103 may include, for example, a radio channel, a wireless communication channel, a BT channel, a BLE channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, a 5 GHz frequency band, a 6-7 GHz frequency band, a milli-meterWave (mmWave) frequency band, e.g., a 60 GHz frequency band, a Sub-1 GHz (S1G) band, and/or any other additional or alternative frequency band.

In some demonstrative aspects, device 102 may include one or more radios including circuitry and/or logic to perform wireless communication between device 102, and one or more other devices. For example, device 102 may include at least one radio 114.

In some demonstrative aspects, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, radio 114 may be configured to communicate over a 2.4 GHz band, a 5 GHz band, a 6-7 GHz band, a mmWave band, an S1G band, and/or any other band.

In some demonstrative aspects, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure, and/or arrangement of one or more antenna elements, components, units, assemblies, and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between device 102 and one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative aspects, at least part of the functionality of controller 124 may be implemented as part of one or more elements of radio 114.

In other aspects, the functionality of controller 124 may be implemented as part of any other element of device 102.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of radio 114.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, device 102 may include, operate as, perform the role of, and/or perform one or more functionalities of, one or more STAs.

In some demonstrative aspects, device 102 may form, or may communicate as part of, a wireless local area network (WLAN).

In some demonstrative aspects, device 102 may form, or may communicate as part of, a WiFi network.

In other aspects, device 102 may form, and/or communicate as part of, any other additional or alternative network.

In some demonstrative aspects, transmitter 118 may be configured to transmit wideband RF Transmit (Tx) signals over a wide channel bandwidth, e.g., as described below.

In some demonstrative aspects, transmitter 118 may be configured to transmit wideband RF Tx signals over a wide bandwidth of at least 80 Megahertz (MHz), e.g., as described below.

In one example, transmitter 118 may be configured to transmit wideband RF Tx signals over a wide channel bandwidth of at least 80 MHz, for example, in a 2.4 GHz wireless communication frequency band, a 5 GHz wireless communication frequency band, a 6-7 GHz wireless communication frequency band, a mmWave band, e.g., a 6 oGHz wireless communication frequency band, and/or any other wireless communication frequency band.

In some demonstrative aspects, transmitter 118 may be configured to transmit wideband RF Tx signals over a wide bandwidth of at least 160 MHz, e.g., as described below.

In one example, transmitter 118 may be configured to transmit wideband RF Tx signals over a wide channel bandwidth of at least 160 MHz, for example, in a 2.4 GHz wireless communication frequency band, a 5 GHz wireless communication frequency band, a 6-7 GHz wireless communication frequency band, a mmWave band, e.g., a 6 oGHz wireless communication frequency band, and/or any other wireless communication frequency band.

In some demonstrative aspects, transmitter 118 may be configured to transmit wideband RF Tx signals over a wide bandwidth of at least 320 MHz, e.g., as described below.

In one example, transmitter 118 may be configured to transmit wideband RF Tx signals over a wide channel bandwidth of at least 320 MHz, for example, in a 2.4 GHz wireless communication frequency band, a 5 GHz wireless communication frequency band, a 6-7 GHz wireless communication frequency band, a mmWave band, e.g., a 6 oGHz wireless communication frequency band, and/or any other wireless communication frequency band.

In other aspects, transmitter 118 may be configured to transmit wideband RF Tx signals over any other additional or alternative wide bandwidth, and/or in any other additional or alternative wireless communication frequency band.

In some demonstrative aspects, transmitter 118 may be configured to generate the wideband RF Tx signals according to an RF Tx signal generation mechanism, which may be configured to address one or more technical issues relating to wideband wireless communication signals, e.g., as described below.

In some demonstrative aspects, transmitter 118 may be configured to generate the wideband RF Tx signals according to an RF Tx signal generation mechanism, which may be configured to suppress one or more harmonics of the wideband RF Tx signals, e.g., as described below.

In some demonstrative aspects, for example, in some use cases, implementations, deployments, and/or scenarios, there may be a need to address a technical issue of elevated signal harmonics in wideband RF Tx signals, e.g., as described below.

For example, a non-linear nature of Tx chains in wireless radios, e.g., analog Tx chains and/or digital Tx chains, may result in elevated signal harmonics.

For example, spectral energy of these elevated harmonics may create regulatory challenges.

For example, in some use cases, implementations, deployments and/or scenarios, there may be one or more technical issues and/or disadvantages to implement post Tx power amplifier filtering to suppress the harmonics may not be efficient.

For example, the post Tx power amplifier filtering may utilize external or on-chip filters to suppress the harmonics, e.g., after a Tx power amplifier of the transmitter.

For example, implementing the post Tx power amplifier filtering to suppress the harmonics may increase cost, increase chip area, and/or may reduce power efficiency.

For example, implementation of the post Tx power amplifier filtering to suppress the harmonics may be limited to narrow band operation, e.g., over relatively narrow channels.

In one example, the post Tx power amplifier filtering may have an impact on a required signal insertion loss and. Accordingly, the post Tx power amplifier filtering may have an impact on system efficiency and/or system power consumption.

In another example, in some cases, the post Tx power amplifier filtering may not even be effective. For example, a filtering post chip may be too late, and an impact of the harmonics through coupling on-chip mechanisms may impact and limit performance. This technical problem may occur, for example, in implementations utilizing simultaneous radio operation, e.g., WiFi Tx with BT Rx, from a same chip and loop back calibration receiver.

For example, according to some techniques, e.g., according to In-phase/Quadrature (IQ) Tx techniques, an RF signal may be generated by combining two amplified signals, e.g., a sine signal (SIN) and a cosine signal (COS).

For example, according to other techniques, e.g., according to digital-Polar-Tx techniques, an RF signal may be generated by toggling cells ON and OFF, e.g., with a modulated clock. These techniques may produce a more "square-ish" signal at the output.

In some demonstrative aspects, an RF signal may have harmonics in odd multiplications of the carrier frequency, for example, in a $3^{rd}$ harmonic, a fifth harmonic, a $7^{th}$ harmonic, and/or one or more additional odd harmonics, e.g., as described below.

In one example, a Fourier break-down of a square signal, denoted x(t), in a time domain may include harmonics in odd multiplications of the carrier frequency, e.g., as follows:

$$x(t) = \text{sign}(\sin(\omega t)) = \frac{4}{\pi}\left(\sin(\omega t) + \frac{1}{3}\sin(3\omega t) + \frac{1}{5}\sin(5\omega t) + \frac{1}{7}\sin(7\omega t) \ldots \right) \quad (1)$$

In another example, a modulated signal, e.g., an OFDM, a SC signal and/or any other modulated signal, may suffer from the odd harmonics, for example, if the modulated signal is generated based on a signal which does not have a sine-wave, e.g., a square-wave.

Figure 2B:
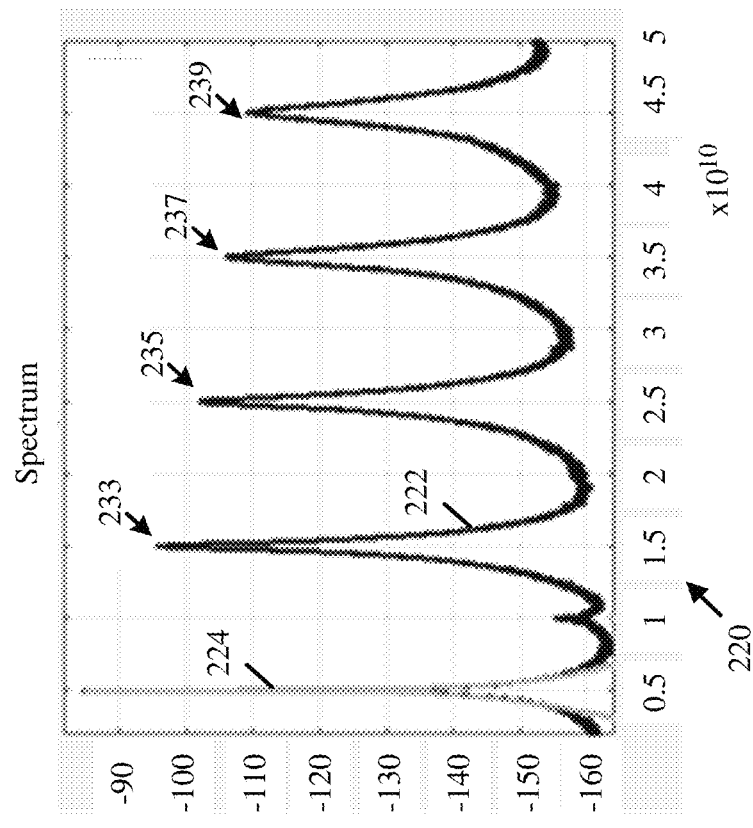
FIG. 2B is a schematic illustration of spectrums of the modulated square-wave wideband signal and the modulated sine-wave wideband signal, to illustrate one or more technical issues, which may be addressed in accordance with some exemplary aspects.
Figure 2A:
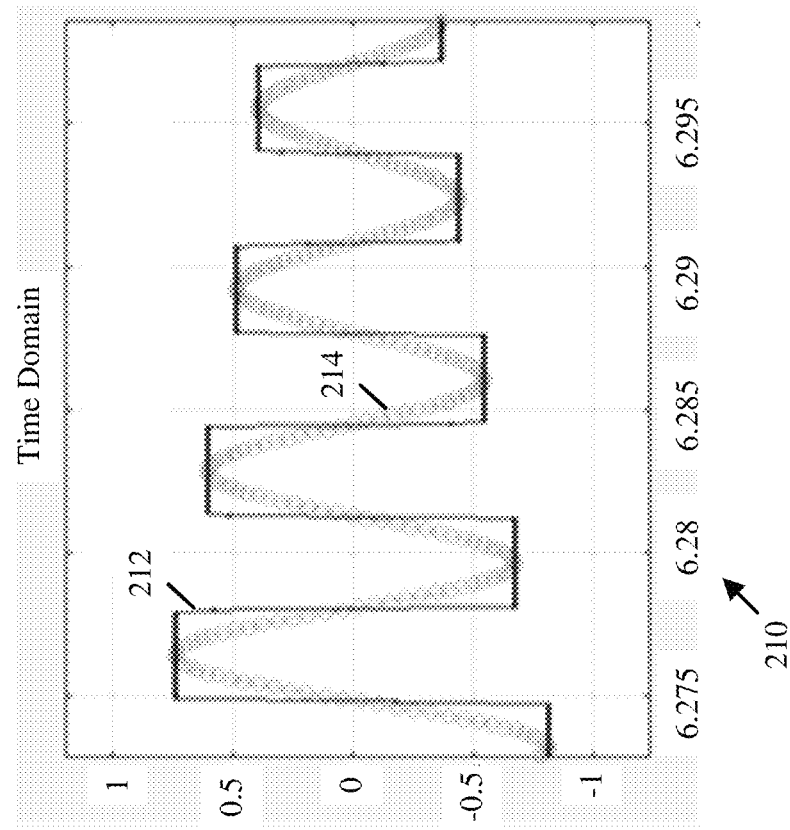
FIG. 2A is a schematic illustration of a modulated square-wave wideband signal and a modulated sine-wave wideband signal in a time domain.

Reference is made to FIG. 2A, which includes a graph 210 depicting a modulated square-wave wideband signal 212 and a modulated sine-wave wideband signal 214 in a time domain, and to FIG. 2B, which includes a graph 220 depicting the spectrum of the modulated square-wave wideband signal 222 and the spectrum of the modulated sine-wave wideband signal 224, to illustrate one or more technical issues, which may be addressed in accordance with some exemplary aspects.

For example, the modulated square-wave wideband signal 212 may include a 160 MHz BW signal generated with a square wave; and/or the sine-wave wideband signal 214 may include a 160 MHz BW signal generated with a sine wave.

For example, the modulated square-wave wideband signal 212 and the modulated sine-wave wideband signal 214 may have substantially the same in-band RF EVM (Error Vector Magnitude).

For example, as shown in FIG. 2B, the spectrum 222 of the modulated square-wave wideband signal 212 may have multiple harmonics around "odd frequencies".

For example, the "odd harmonics" may include harmonics in which frequencies are odd multiples, e.g., 3, 5, 7, 9, etc., of a base (fundamental) frequency.

For example, "even harmonics" may include harmonics whose frequencies are even multiples, e.g., 2, 4, 6, 8, etc., of the fundamental frequency.

In one example, in the spectrum of FIG. 2B, the odd harmonics may include odd multiples, e.g., 3, 5, 7, 9, etc., of the base frequency $0.5*10^{10}$.

For example, as shown in FIG. 2B, the spectrum 224 of the modulated sine-wave wideband signal 214 may have a single peak at the frequency $0.5*10^{10}$.

For example, as shown in FIG. 2B, the spectrum 222 of the modulated square-wave wideband signal 212 may have additional peaks at the odd harmonics, e.g., a $3^{rd}$ harmonic 233 at the frequency $3*0.5*10^{10}=1.5*10^{10}$, a $5^{th}$ harmonic 235 at the frequency $5*0.5*10^{10}=2.5*10^{10}$, a $7^{th}$ harmonic 237 at the frequency $7*0.5*10^{10}=3.5*10^{10}$, and a $9^{th}$ harmonic 239 at the frequency $9*0.5*10^{10}=4.5*10^{10}$.

Referring back to FIG. 1, in some demonstrative aspects, transmitter 118 may be configured to generate the wideband RF Tx signals according to an RF Tx signal generation mechanism, which may be configured to suppress one or more harmonics, e.g., odd harmonics, of the wideband RF Tx signals, for example, based on phase shifted "versions" of a modulated signal, e.g., as described below.

In some demonstrative aspects, transmitter 118 may be configured to generate the wideband RF Tx signals according to an RF Tx signal generation mechanism, which may be configured combine the phase shifted "versions" of the modulated signal, for example, in order to suppress one or more harmonics, e.g., odd harmonics, of a wideband RF Tx signal, e.g., as described below.

In some demonstrative aspects, transmitter 118 may be configured to generate the wideband RF Tx signals according to an RF Tx signal generation mechanism, which may be configured to provide a technical solution to suppress e.g., "from the base", one or more harmonics, e.g., the odd harmonics, as described below.

In some demonstrative aspects, transmitter 118 may be configured to generate the wideband RF Tx signals according to an RF Tx signal generation mechanism, which may be configured to provide a technical solution supporting the use of digital-polar-Tx techniques, for example, even without adding an external filter and/or even without violating Tx masks. For example, the digital-polar-Tx techniques may be more efficient than IQ Tx techniques.

In some demonstrative aspects, transmitter 118 may be configured to generate the wideband RF Tx signals according to an RF Tx signal generation mechanism, which may be configured to provide a technical solution supporting a wideband suppression of harmonics, e.g., odd harmonics, which may be designed, for example, to be independent of a carrier frequency.

In some demonstrative aspects, transmitter 118 may be configured to generate the wideband RF Tx signals according to an RF Tx signal generation mechanism, which may be configured to provide a technical solution supporting selective wideband suppression of harmonics, e.g., odd harmonics, which may be, for example, "turned" on or off, e.g., depending on a situation, and/or may recover an efficiency impact.

In some demonstrative aspects, transmitter 118 may include an input (IN) 152 to input a baseband signal 154, e.g., as described below.

In some demonstrative aspects, transmitter 118 may include an RF Tx signal generator 156, which may be configured to generate a wideband RF Tx signal 160 having a wide bandwidth, e.g., of at least 80 MHz, based on the baseband signal 154, e.g., as described below.

In some demonstrative aspects, RF Tx signal generator 156 may be configured to generate the wideband RF Tx signal 160 including a suppressed third harmonic and a suppressed fifth harmonic, e.g., as described below.

In some demonstrative aspects, RF Tx signal generator 156 may be configured to generate the wideband RF Tx signal 160 including one or more additional or alternative harmonics, e.g., odd harmonics.

In some demonstrative aspects, RF Tx signal generator 156 may be configured to generate the wideband RF Tx signal 160 including the suppressed third harmonic and/or the suppressed fifth harmonic having, for example, a suppression of at least [50-3*log2(BW/80)] decibel (dB), for example, relative to a carrier of the wideband RF Tx signal 160, wherein BW denotes the wide bandwidth in units of MHz, e.g., as described below.

In some demonstrative aspects, RF Tx signal generator 156 may be configured to generate the wideband RF Tx signal 160 including the suppressed third harmonic and/or the suppressed fifth harmonic having, for example, a suppression of at least [53-3*log2(BW/80)] dB relative to the carrier of the wideband RF Tx signal 160, e.g., as described below.

In some demonstrative aspects, RF Tx signal generator 156 may be configured to generate the wideband RF Tx signal 160 including the suppressed third harmonic and/or the suppressed fifth harmonic having, for example, a suppression of at least [55-3*log2(BW/80)] dB relative to the carrier of the wideband RF Tx signal 160, e.g., as described below.

In other aspects, RF Tx signal generator 156 may be configured to generate the wideband RF Tx signal 160 including the suppressed third harmonic and/or the suppressed fifth harmonic having any other level of suppression.

In some demonstrative aspects, RF Tx signal generator 156 may be configured to generate the wideband RF Tx signal 160 based on an unfiltered Power Amplifier (PA) output, e.g., as described below.

In some demonstrative aspects, RF Tx signal generator 156 may be configured to generate the wideband RF Tx signal 160 including, for example, an unfiltered power-amplified Tx signal, e.g., as described below.

In some demonstrative aspects, transmitter 118 may include an output (OUT) 158 to output the wideband RF Tx signal 160, e.g., to be transmitted via antenna 107.

In some demonstrative aspects, RF Tx signal generator 156 may be configured to generate a first wideband RF signal based on the baseband signal 154, and a second wideband RF signal based on the baseband signal 154, e.g., as described below.

In some demonstrative aspects, RF Tx signal generator 156 may be configured to generate the second wideband RF signal having a predefined phase shift relative to the first wideband RF signal, e.g., as described below.

In some demonstrative aspects, RF Tx signal generator 156 may be configured to generate the wideband RF Tx signal 160 based, for example, on a combination of the first wideband RF signal and the second wideband RF signal, e.g., as described below.

In some demonstrative aspects, RF Tx signal generator 156 may be configured to generate the second wideband RF signal having a phase shift of about 90 degrees relative to the first wideband RF signal, e.g., as described below.

In other aspects, the RF Tx signal generator 156 may be configured to generate the second wideband RF signal having any other predefined phase shift relative to the first wideband RF signal.

In some demonstrative aspects, RF Tx signal generator 156 may be configured to a third wideband RF signal based on the baseband signal 154, and to generate the wideband RF Tx signal 160 based, for example, on a combination of the first wideband RF signal, the second wideband RF signal, and the third wideband RF signal, e.g., as described below.

In some demonstrative aspects, RF Tx signal generator 156 may be configured to generate a first Modulated Local Oscillator (MOLO) signal and a second MOLO signal by modulating a Local Oscillator (LO) signal based on the baseband signal 154, e.g., as described below.

In some demonstrative aspects, RF Tx signal generator 156 may be configured to generate the second MOLO signal having the predefined phase shift relative to the first MOLO signal, e.g., as described below.

In some demonstrative aspects, RF Tx signal generator 156 may be configured to generate the first wideband RF signal, for example, based on the first MOLO signal, e.g., as described below.

In some demonstrative aspects, RF Tx signal generator 156 may be configured to generate the second wideband RF signal, for example, based on the second MOLO signal, e.g., as described below.

In some demonstrative aspects, RF Tx signal generator 156 may be configured to generate a third wideband RF signal, for example, based on the first and second MOLO signals, e.g., as described below.

In some demonstrative aspects, RF Tx signal generator 156 may be configured to generate the wideband RF Tx signal 160 based, for example, on a combination of the first wideband RF signal, the second wideband RF signal, and the third wideband RF signal, e.g., as described below.

In some demonstrative aspects, RF Tx signal generator 156 may be configured to combine shifted versions of a signal based on the baseband signal 154, e.g., as described below.

In some demonstrative aspects, a first phase-shifted signal may be generated, for example, by shifting a phase of a single-frequency-square-wave, for example, by a phase shift of 45°, for example, which may be similar to applying a time shift of $$\Delta = \frac{45}{360}\frac{\omega}{2\pi},$$

e.g., as follows:

$$x(t + \Delta)\text{sign}(\sin(\omega(t + \Delta))) =$$

$$\frac{4}{\pi}\left(\sin(\omega t + \omega\Delta) + \frac{1}{3}\sin(3\omega t + 3\omega\Delta) + \frac{1}{5}\sin(5\omega t + 5\omega\Delta) + \frac{1}{7}\sin(7\omega t + 7\omega\Delta) \ldots \right) =$$

$$\frac{4}{\pi}\left(\sin(\omega t)\cos(\omega\Delta) + \cos(\omega t)\sin(\omega\Delta) + \frac{1}{3}\sin(3\omega t)\cos(3\omega\Delta) + \frac{1}{3}\cos(3\omega t)\sin(3\omega\Delta) \ldots \right) =$$

$$\frac{4}{\pi}\left(\sin(\omega t)\cos(45°) + \cos(\omega t)\sin(45°) + \frac{1}{3}\sin(3\omega t)\cos(135°) + \frac{1}{3}\cos(3\omega t)\sin(135°) \ldots \right) =$$

$$\frac{4}{\pi}\left(\sin(\omega t)\frac{1}{\sqrt{2}} + \cos(\omega t)\frac{1}{\sqrt{2}} + \frac{1}{3}\sin(3\omega t)\frac{-1}{\sqrt{2}} + \frac{1}{3}\cos(3\omega t)\frac{1}{\sqrt{2}}\ldots \right) =$$

$$\frac{4}{\sqrt{2}\pi}\left(\sin(\omega t) + \cos(\omega t) - \frac{\sin(3\omega t)}{3} + \frac{\cos(3\omega t)}{3} - \frac{\sin(5\omega t)}{5} - \frac{\cos(5\omega t)}{5} \ldots \right)$$

(2)

In some demonstrative aspects, a second phase-shifted signal may be generated, for example, by shifting the phase of a single-frequency-square-wave, for example, by a phase shift of (−45)°, e.g., as follows:

$$x(t - \Delta) = \frac{4}{\sqrt{2}\pi}$$

$$\left(\sin(\omega t) - \cos(\omega t) - \frac{\sin(3\omega t)}{3} - \frac{\cos(3\omega t)}{3} - \frac{\sin(5\omega t)}{5} + \frac{\cos(5\omega t)}{5} \ldots \right)$$

(3)

In some demonstrative aspects, a combined signal may be generated, for example, by combining the first phase-shifted signal and the second phase-shifted signal, e.g., as follows:

$$x(t + \Delta) + x(t - \Delta) =$$

$$\sqrt{2}\cdot\frac{4}{\pi}\left(\sin(\omega t) - \frac{\sin(3\omega t)}{3} - \frac{\sin(5\omega t)}{5} + \frac{\sin(7\omega t)}{7} \ldots \right)$$

(4)

In some demonstrative aspects, when comparing the combined signal, e.g., according to Equation 4, with the Fourier transform of the single-frequency-square-wave without the phase shift, e.g., according to Equation 1, it may be seen that the first harmonic of the combined signal may be the same as the first harmonic of the single-frequency-square-wave without the phase shift, e.g., with a factor of $\sqrt{2}$; and that the 3rd and 5th harmonics of the combined signal may have a negative sign, which may be opposite to the sign of the 3rd and 5th harmonics of the single-frequency-square-wave without the phase shift.

In some demonstrative aspects, the first phase-shifted signal and the second phase-shifted signal may be combined with the frequency-square-wave without the phase shift, for example, to cancel out the 3rd and 5th harmonics, e.g., as follows:

$$x(t) + \frac{x(t+\Delta)}{\sqrt{2}} + \frac{x(t-\Delta)}{\sqrt{2}} = 2 \cdot \frac{4}{\pi}\left(\sin(\omega t) + 0 + 0 + \frac{\sin(7\omega t)}{7} \ldots \right) \quad (5)$$

In some demonstrative aspects, it may be seen from Equation 5 that the 3rd and 5th harmonics may be suppressed.

In some demonstrative aspects, although the $7^{th}$ and $9^{th}$ harmonics do not cancel out, e.g., in Equation 5, the $7^{th}$ and $9^{th}$ harmonics may have a relatively low gain. For example, in many system implementations, higher frequencies may have an inherent suppression. Accordingly, the higher harmonics, e.g., the $7^{th}$ and $9^{th}$ harmonics, may be less likely to cause mask violations.

In some demonstrative aspects, the technique of combining the phase-shifted signals to suppress the 3rd and 5th harmonics for the single-frequency-square-wave, e.g., as described above, may be implemented in a similar manner to suppress the 3rd and 5th harmonics for modulated signals.

In some demonstrative aspects, a modulated signal having a bandwidth (BW) greater than zero may be considered as a superposition of single-frequency signals. Accordingly, the technique of combining the phase-shifted signals to suppress the 3rd and 5th harmonics may also hold for the modulated signal. For example, conversion between phase-shift and time delay may depend on the frequency. Accordingly, a common time-delay may not result in the same phase-shift for the whole BW. For example, a modulated square signal may not be a superposition of single-frequency-square-waves. However, the technique of combining the phase-shifted signals to suppress the 3rd and 5th harmonics may still holds, for example, even for wide BW signals, e.g., as described below.

In some demonstrative aspects, the technique of combining the phase-shifted signals to suppress the 3rd and 5th harmonics may be implemented utilizing a constant time-delay offset, e.g., as described below.

In some demonstrative aspects, a time-delay may be relative to an instantaneous frequency of the signal. For example, for BW which is relatively narrow relative to the carrier frequency, the time-delay may be approximated with a constant time-delay. In one example, a phase shift of 45° may be approximated by a 25 picosecond (ps) time delay, e.g., for a 5 GHz carrier frequency.

Figure 3:
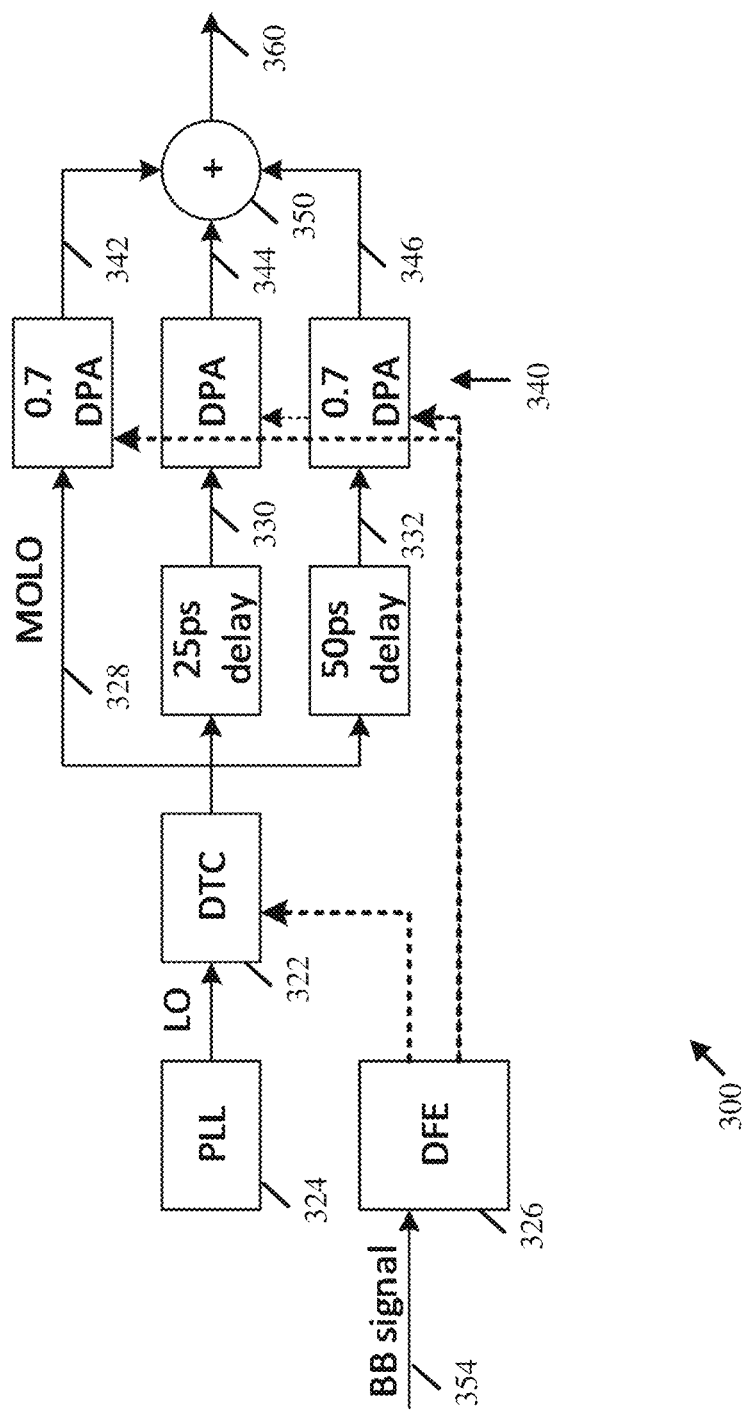
FIG. 3 is a schematic illustration of a Radio Frequency (RF) Transmit (Tx) signal generator, in accordance with some demonstrative aspects.

Reference is made to FIG. 3, which schematically illustrates an RF Tx signal generator 300, in accordance with some demonstrative aspects.

In some demonstrative aspects, RF Tx signal generator 300 may be configured to generate an RF Tx signal 360 based on a baseband signal 354, e.g., as described below.

In some demonstrative aspects, RF Tx signal generator 300 may include a Digital Time Converter (DTC) 322 configured to generate a MOLO signal 328 by modulating a phase of an LO signal, e.g., from a Phase-Locked-Loop (PLL) 324.

In some demonstrative aspects, RF Tx signal generator 300 may include a Digital Front End (DFE) 326, which may be configured to control generation of the MOLO signal by the DTC 322, for example, based on the baseband signal 354.

In some demonstrative aspects, as shown in FIG. 3, RF Tx signal generator 300 may be configured to generate a first delayed version 330 of the MOLO signal, for example, by a applying a first time delay, e.g., a time delay of 25 ps, to the MOLO signal 328. For example, the first time delay may be configured to represent a first phase shift, e.g., a phase shift of 45°.

In some demonstrative aspects, as shown in FIG. 3, RF Tx signal generator 300 may be configured to generate a second delayed version 332 of the MOLO signal, for example, by a applying a second time delay, e.g., a time delay of 50 ps, to the MOLO signal 328. For example, the second time delay may be configured to represent a second phase shift, e.g., a phase shift of (−45)°.

In some demonstrative aspects, RF Tx signal generator 300 may include a Digital Power Amplifier (DPA) to generate a modulated signal 342, for example, by modulating an amplitude of the MOLO signal 328, to generate a modulated signal 334442, for example, by modulating an amplitude of the delayed MOLO signal 330, and/or to generate a modulated signal 346, for example, by modulating an amplitude of the delayed MOLO signal 332.

In some demonstrative aspects, DFE 326 may be configured to control generation of the modulated signals 342, 344, and/or 346 by the DPA 340, for example, based on the baseband signal 354.

In some demonstrative aspects, RF Tx signal generator 300 may include a combiner to generate the RF Tx signal 360 based on a combination of the modulated signals 342, 344, and/or 346.

In some demonstrative aspects, RF Tx signal generator 300 may be able to produce the RF Tx signal 360 having relatively good suppression of the $3^{rd}$ and $5^{th}$ harmonics, e.g., for a relatively narrow BW.

In some demonstrative aspects, RF Tx signal generator 300 may be implemented to provide a technical solution utilizing a single DTC.

In some demonstrative aspects, in some implementations, use cases, and/or scenarios, implementing an accurate time-delay may be challenging. In one example, the time delay may have temperature dependency. In another example, the time delay may be calculated for a specific carrier-frequency, and may need to be adjusted when changing to a different channel.

In some demonstrative aspects, there may be some degradation in harmonic suppression, for example, when implementing the time-delay technique described above for a wide BW, e.g., as described below.

Figure 4:
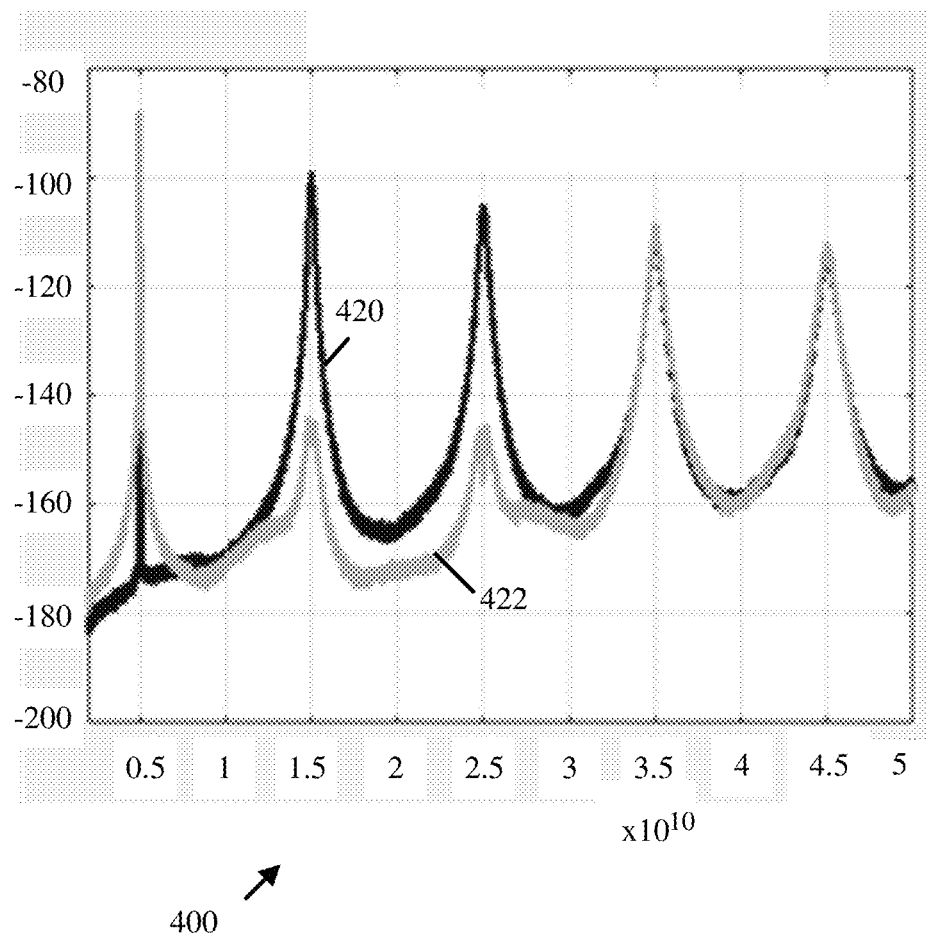
FIG. 4 is a schematic illustration of a spectrum of a modulated square-wave wideband signal and a suppressed modulated square-wave wideband signal, in accordance with some exemplary aspects.

Reference is made to FIG. 4, which illustrates a graph 400 depicting a spectrum of a modulated square-wave wideband signal 420 and a suppressed modulated square-wave wideband signal 422, in accordance with some exemplary aspects. In one example, suppressed modulated square-wave wideband signal 422 may be generated by an RF Tx signal generator, e.g., RF Tx signal generator 300 (FIG. 3), utilizing a time-delay technique.

For example, the modulated square-wave wideband signal 420 may include a 160 MHz BW signal, e.g., at a 5 GHz central frequency, generated with a square wave; and/or the suppressed modulated square-wave wideband signal 422 may include a 160 MHz BW signal, e.g., at a 5 GHz central frequency, generated by applying time delay offset to the square wave, e.g., as described above.

In some demonstrative aspects, as shown in FIG. 4, the suppressed modulated square-wave wideband signal 422 may have suppressed $3^{rd}$ and $5^{th}$ harmonics, e.g., compared to the modulated square-wave wideband signal 420. For example, as shown in FIG. 4, the $3^{rd}$ and $5^{th}$ harmonics of suppressed modulated square-wave wideband signal 422 may be suppressed by about 40 dB.

Referring back to FIG. 1, in some demonstrative aspects, RF Tx signal generator 156 may be configured to generate the wideband RF Tx signal 160, for example, based on a phase-offset technique, e.g., as described below.

In some demonstrative aspects, for example, in some use case, scenarios, and/or implementations the phase-offset technique may provide a technical solution, which may be more accurate, e.g., compared to the time-delay technique described above.

In some demonstrative aspects, the phase-offset technique may be implemented to provide a technical solution to generate the wideband RF Tx signal 160 with an improved level of odd harmonic suppression, e.g., as described below.

In some demonstrative aspects, the phase-offset technique may be implemented to provide a technical solution to generate the wideband RF Tx signal 160 with an improved EVM, for example, with no EVM degradation, or with reduced EVM degradation, e.g., as described below.

In some demonstrative aspects, the phase-offset technique may be implemented to provide a technical solution to generate the wideband RF Tx signal 160, for example, in a manner which may be independent of the carrier frequency. Accordingly, the phase-offset technique may be implemented to provide a technical solution to generate the wideband RF Tx signal 160, for example, while avoiding changes and/or adjustments, e.g., when changing carrier frequencies.

In some demonstrative aspects, RF Tx signal generator 156 may be configured to generate a first wideband RF signal based on the baseband signal 154, a second wideband RF signal based on the baseband signal 154, and a third wideband RF signal based on the baseband signal 154, e.g., as described below.

In some demonstrative aspects, RF Tx signal generator 156 may be configured to generate the second wideband RF signal having a predefined phase shift relative to the first wideband RF signal, e.g., as described below.

In some demonstrative aspects, RF Tx signal generator 156 may be configured to generate the second wideband RF signal having a phase shift of about 90 degrees relative to the first wideband RF signal, e.g., as described below.

In other aspects, RF Tx signal generator 156 may be configured to generate the second wideband RF signal having any other predefined phase shift relative to the first wideband RF signal.

In some demonstrative aspects, RF Tx signal generator 156 may be configured to generate the wideband RF Tx signal 160 based, for example, on a combination of the first wideband RF signal, the second wideband RF signal, and the third wideband RF signal, e.g., as described below.

Figure 5:
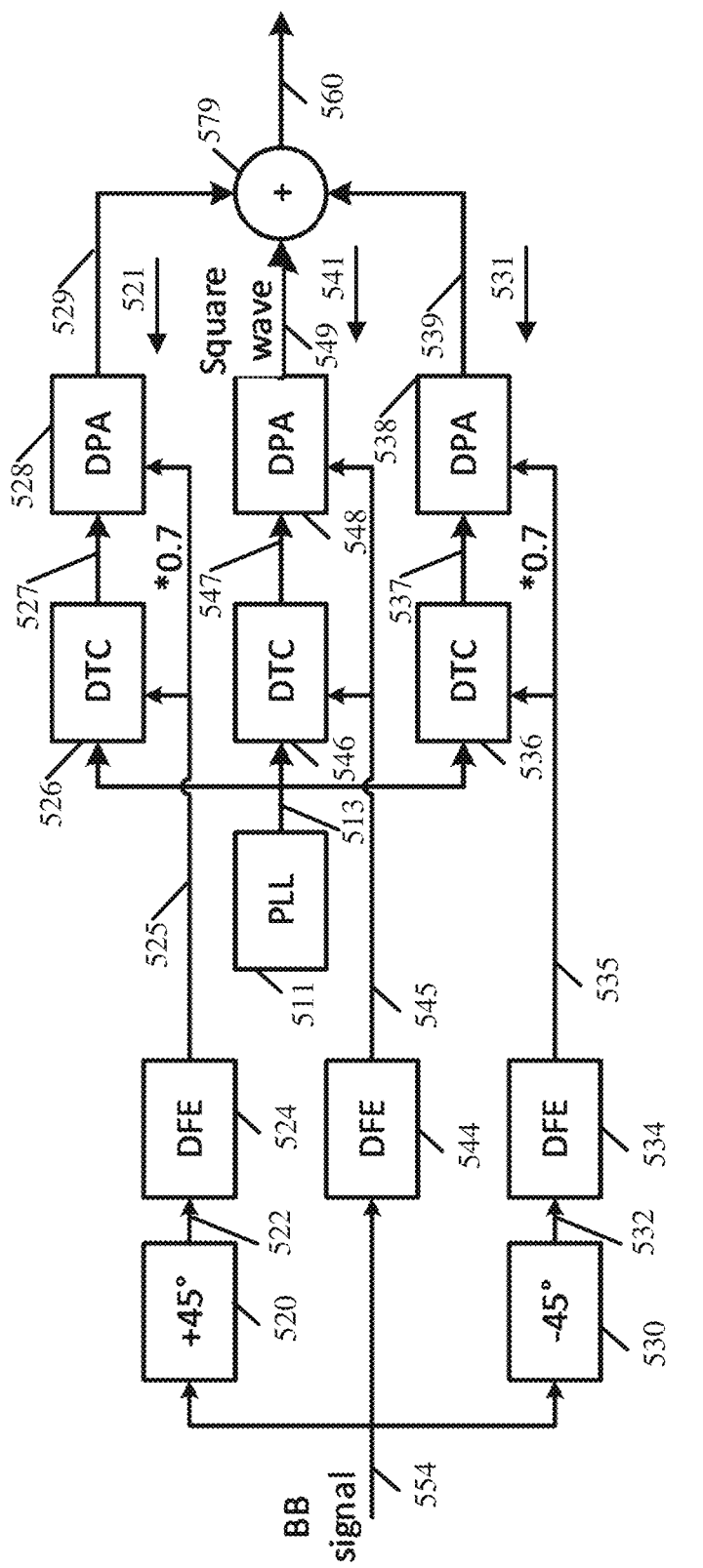
FIG. 5 is a schematic illustration of an RF Tx signal generator, in accordance with some demonstrative aspects.

Reference is made to FIG. 5, which schematically illustrates an RF Tx signal generator 500, in accordance with some demonstrative aspects. For example, RF Tx signal generator 156 (FIG. 1) may be configured to include one or more elements of RF Tx signal generator 500, and/or to perform one or more operations and/or functionalities of RF Tx signal generator 500.

In some demonstrative aspects, RF Tx signal generator 500 may be configured to generate an RF Tx signal 560 based on a baseband signal 554, e.g., as described below.

In some demonstrative aspects, RF Tx signal generator 500 may include a first phase shifter 520 configured to generate a first phase-shifted baseband signal 522 by applying a first phase shift to the baseband signal 554.

In some demonstrative aspects, the first phase shift may be in a range of about 44-46 degrees. In one example, as shown in FIG. 5, the first phase shift may be about 45 degrees.

In other aspects, the first phase shift may include any other phase shift.

In some demonstrative aspects, RF Tx signal generator 500 may include a second phase shifter 530 configured to generate a second phase-shifted baseband signal 532 by applying a second phase shift to the baseband signal 554.

In some demonstrative aspects, the second phase shift may be in a range of about (−46)-(−44) degrees. In one example, as shown in FIG. 5, the second phase shift may be about (−45) degrees.

In other aspects, the second phase shift may include any other phase shift.

In some demonstrative aspects, RF Tx signal generator 500 may include a first Digital Transmit (DTx) chain 521 configured to generate a first wideband RF signal 529 based on the first phase-shifted baseband signal 522, e.g., as described below.

In some demonstrative aspects, DTx chain 521 may be configured to generate the first wideband RF signal 529 based, for example, on an LO signal 513 and the first phase-shifted baseband signal 522, e.g., as described below. For example, LO signal 513 may be provided by a PLL 511.

In some demonstrative aspects, RF Tx signal generator 500 may include a second DTx chain 531 configured to generate a second wideband RF signal 539 based on the second phase-shifted baseband signal 532, e.g., as described below.

In some demonstrative aspects, DTx chain 531 may be configured to generate the second wideband RF signal 539 based, for example, on the LO signal 513 and the second phase-shifted baseband signal 532, e.g., as described below.

In some demonstrative aspects, RF Tx signal generator 500 may include a third DTx chain 541 configured to generate a third wideband RF signal 549 based on the baseband signal 554, e.g., as described below.

In some demonstrative aspects, DTx chain 531 may be configured to generate the third wideband RF signal 549 based, for example, on the LO signal 513 and the baseband signal 554, e.g., as described below.

In some demonstrative aspects, RF Tx signal generator 500 may include a combiner 579, which may be configured to generate the wideband RF Tx signal 560 based, for example, on a combination of the first wideband RF signal 529, the second wideband RF signal 539, and the third wideband RF signal 549.

In some demonstrative aspects, combiner 579 may be configured to generate the wideband RF Tx signal 560 based, for example, on a summation of the first wideband RF signal 529, the second wideband RF signal 539, and the third wideband RF signal 549.

In other aspects, combiner 579 may be configured to generate the wideband RF Tx signal 560 based on any other combination of the first wideband RF signal 529, the second wideband RF signal 539, and the third wideband RF signal 549.

In some demonstrative aspects, at least one particular DTx chain of the DTx chains 521, 531, and/or 541 may include a DFE to generate a first control signal and a second control signal based on a baseband signal applied to the particular DTx chain, e.g., as described below.

In some demonstrative aspects, the particular DTx chain may include a DTC to generate a MOLO signal by modulating a phase of the LO signal 513 based on the first control signal, e.g., as described below.

In some demonstrative aspects, the particular DTx chain may include a DPA to generate a particular wideband RF signal corresponding to the particular baseband signal, for example, by modulating an amplitude of the MOLO signal based on the second control signal, e.g., as described below.

In some demonstrative aspects, DTx chain 521 may include a DFE 524 to generate control signals 525, e.g., including a first control signal and a second control signal, for example, based on phase-shifted baseband signal 522.

In some demonstrative aspects, DTx chain 521 may include a DTC 526 to generate a MOLO signal 527 by modulating a phase of the LO signal 513, for example, based on the first control signal of control signals 525.

In some demonstrative aspects, DTx chain 521 may include a DPA 528 to generate wideband RF signal 529, for example, by modulating an amplitude of the MOLO signal 527, for example, based on the second control signal of control signals 525.

In some demonstrative aspects, DTx chain 531 may include a DFE 534 to generate control signals 535, e.g., including a first control signal and a second control signal, for example, based on phase-shifted baseband signal 532.

In some demonstrative aspects, DTx chain 531 may include a DTC 536 to generate a MOLO signal 537 by modulating a phase of the LO signal 513, for example, based on the first control signal of control signals 535.

In some demonstrative aspects, DTx chain 531 may include a DPA 538 to generate wideband RF signal 539, for example, by modulating an amplitude of the MOLO signal 537, for example, based on the second control signal of control signals 535.

In some demonstrative aspects, DTx chain 541 may include a DFE 544 to generate control signals 545, e.g., including a first control signal and a second control signal, for example, based on baseband signal 554.

In some demonstrative aspects, DTx chain 541 may include a DTC 546 to generate a MOLO signal 547 by modulating a phase of the LO signal 513, for example, based on the first control signal of control signals 545.

In some demonstrative aspects, DTx chain 541 may include a DPA 548 to generate wideband RF signal 549, for example, by modulating an amplitude of the MOLO signal 547, for example, based on the second control signal of control signals 545.

In some demonstrative aspects, as shown in FIG. 5, RF Tx signal generator 500 may be configured to generate the wideband RF Tx signal 560, for example, on an unfiltered Power Amplifier (PA) output, e.g., the signal 529 output by DPA 528, the signal 539 output by DPA 538, and the signal 549 output by the DPA 548.

In some demonstrative aspects, as shown in FIG. 5, RF Tx signal generator 500 may be configured to generate the wideband RF Tx signal 560 including, for example, an unfiltered power-amplified Tx signal, e.g., prior to any filter mechanisms.

In some demonstrative aspects, an architecture of RF Tx signal generator 500 may provide a technical solution, which may be relatively easy for implementation.

In some demonstrative aspects, an architecture of RF Tx signal generator 500 may provide a technical solution, which may have substantially no EVM degradation.

In some demonstrative aspects, the architecture of RF Tx signal generator 500 may be implemented to provide a technical solution utilizing a phase shift performed on the complex-base-band signal 554. Accordingly, the architecture of RF Tx signal generator 500 may be implemented to provide a technical solution with improved, e.g., optimal, performance, for example, for some or all frequencies, e.g., regardless of the carrier-frequency and/or regardless of the BW.

Figure 6:
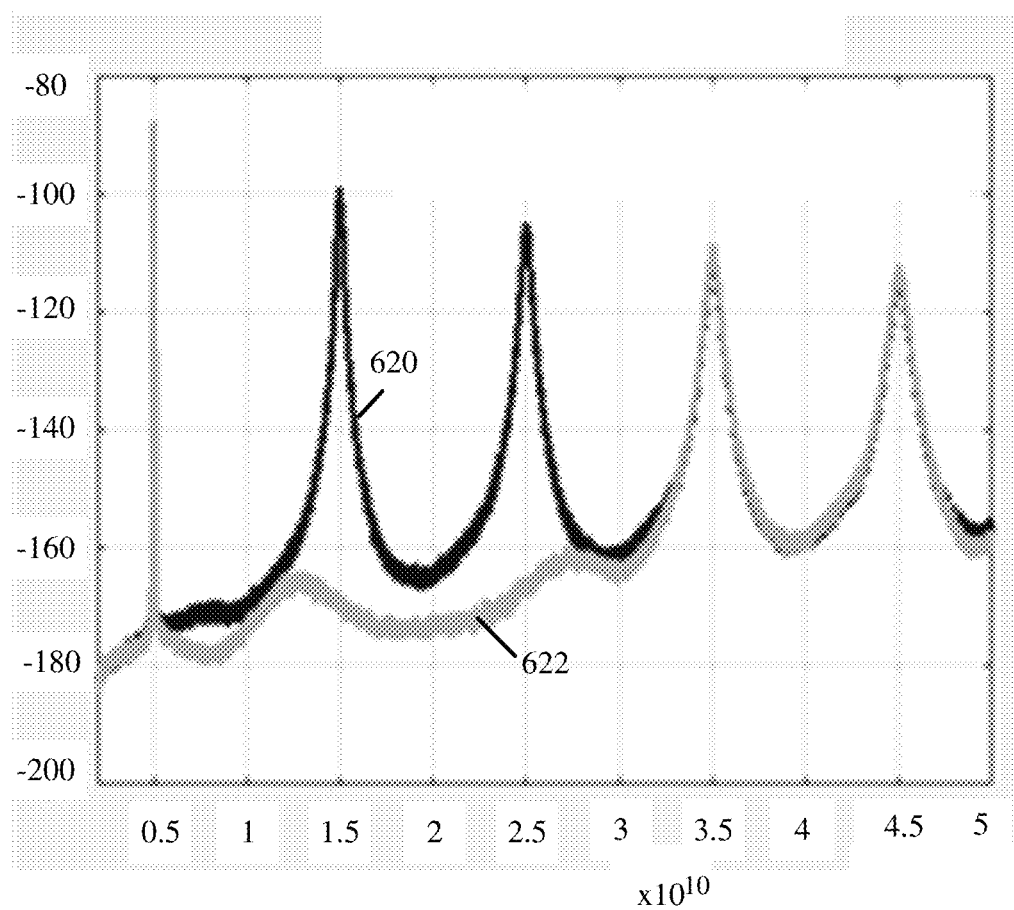
FIG. 6 is a schematic illustration of a spectrum of a modulated square-wave wideband signal and a suppressed modulated square-wave wideband signal, in accordance with some exemplary aspects.

Reference is made to FIG. 6, which illustrates a graph 600 depicting a spectrum of a modulated square-wave wideband signal 620 and a suppressed modulated square-wave wideband signal 622, in accordance with some exemplary aspects. In one example, suppressed modulated square-wave wideband signal 622 may be generated by an RF Tx signal generator, e.g., RF Tx signal generator 500 (FIG. 5), utilizing a phase-offset technique.

For example, the modulated square-wave wideband signal 620 may include a 160 MHz BW signal, e.g., at a 5 GHz central frequency, generated with a square wave; and/or the suppressed modulated square-wave wideband signal 622 may include a 160 MHz BW signal, e.g., at a 5 GHz central frequency, generated by applying a phase shift to the square wave signal, e.g., as described above.

In some demonstrative aspects, as shown in FIG. 6, the suppressed modulated square-wave wideband signal 622 may have suppressed $3^{rd}$ and $5^{th}$ harmonics, e.g., compared to the modulated square-wave wideband signal 620.

For example, as shown in FIG. 6, the $3^{rd}$ harmonic of suppressed modulated square-wave wideband signal 622 may be suppressed by about 64 dB.

For example, as shown in FIG. 6, the $5^{th}$ harmonic of suppressed modulated square-wave wideband signal 622 may be suppressed by about 55 dB.

Referring back to FIG. 1, in some demonstrative aspects, RF Tx signal generator 156 may be configured to generate the wideband RF Tx signal 160, for example, based on a phase-offset technique applied with respect to MOLO signals, e.g., as described below.

In some demonstrative aspects, a phase shift in a complex-BB-domain may translate into an edge-delay in a modulated clock, e.g., a real modulated clock. For example, the edge delay may not be a constant delay, but rather a delay relative to an instantaneous frequency of the modulated signal, e.g., since the modulated signal is different from a Continuous Wave (CW).

In some demonstrative aspects, the edge-delay may be applied to the modulated signal using an edge interpolation.

In some demonstrative aspects, a modulated signal with a phase shift of 0° may be generated, for example, based on edge interpolation on two modulated signals having a phase shift 90°.

In some demonstrative aspects, a modulated signal with a phase shift of 0° may be generated, e.g., relatively accurately, for example, by interpolating the edges of a version of the modulated signal with a phase shift of (−45)° and a version of the modulated signal with a phase shift of (+45)°.

In some demonstrative aspects, a first version of a modulated signal and a second version of the modulated signal, e.g., having a 90° phase difference relative to the first version, may be generated, for example, by interpolation between a rise and a fall of one of the first and second versions.

In some demonstrative aspects, a first version of a modulated signal and a second version of the modulated signal, e.g., having a 90° phase difference relative to the first version, may be generated, for example, using two DTCs.

In some demonstrative aspects, the 90° phase offset may not represent a constant delay, but rather an offset which is relative to the instantaneous frequency of the modulated signal. For example, for a modulated signal having a center frequency, e.g., Fc=5 GHz, and a signal bandwidth, e.g., BW=160 MHz, an average cycle may be about 200 ps, while each individual cycle may be different. For example, in case a cycle is 160 ps, then the 90° offset may be 40 ps.

In some demonstrative aspects, RF Tx signal generator 156 may utilize 3 DPAs to generate amplitude-modulated outputs, which may be combined, for example, to generate the amplitude modulation of the wideband RF Tx signal 160. According to these aspects, the same control signals or codes may be provided to the 3 DPAs.

In other aspects, RF Tx signal generator 156 may generate the amplitude modulation of the wideband RF Tx signal 160, for example, by splitting a DPA into cells with the appropriate gains. According to these aspects, different and/or separate control signals or codes may be provided to the DPA cells.

In some demonstrative aspects, RF Tx signal generator 156 may be configured to generate a first MOLO) signal and a second MOLO signal by modulating an LO signal based on the baseband signal 154, e.g., as described below.

In some demonstrative aspects, RF Tx signal generator 156 may be configured to generate the second MOLO signal having a predefined phase shift relative to the first MOLO signal, e.g., as described below.

In some demonstrative aspects, RF Tx signal generator 156 may be configured to generate the second MOLO signal having a phase shift of about 90 degrees relative to the first MOLO signal, e.g., as described below.

In other aspects, the RF Tx signal generator 156 may be configured to generate the second MOLO signal having any other predefined phase shift relative to the first MOLO signal.

In some demonstrative aspects, RF Tx signal generator 156 may be configured to generate a first wideband RF signal based on the first MOLO signal, e.g., as described below.

In some demonstrative aspects, RF Tx signal generator 156 may be configured to generate a second wideband RF signal, for example, based on the second MOLO signal, e.g., as described below.

In some demonstrative aspects, RF Tx signal generator 156 may be configured to generate a third wideband RF signal, for example, based on the first and second MOLO signals, e.g., as described below.

In some demonstrative aspects, RF Tx signal generator 156 may be configured to generate wideband RF Tx signal 160, for example, based on a combination of the first wideband RF signal, the second wideband RF signal, and the third wideband RF signal, e.g., as described below.

In some demonstrative aspects, RF Tx signal generator 156 may be configured to generate the third wideband RF signal, for example, based on an edge interpolation of the first and second MOLO signals, e.g., as described below.

Figure 7:
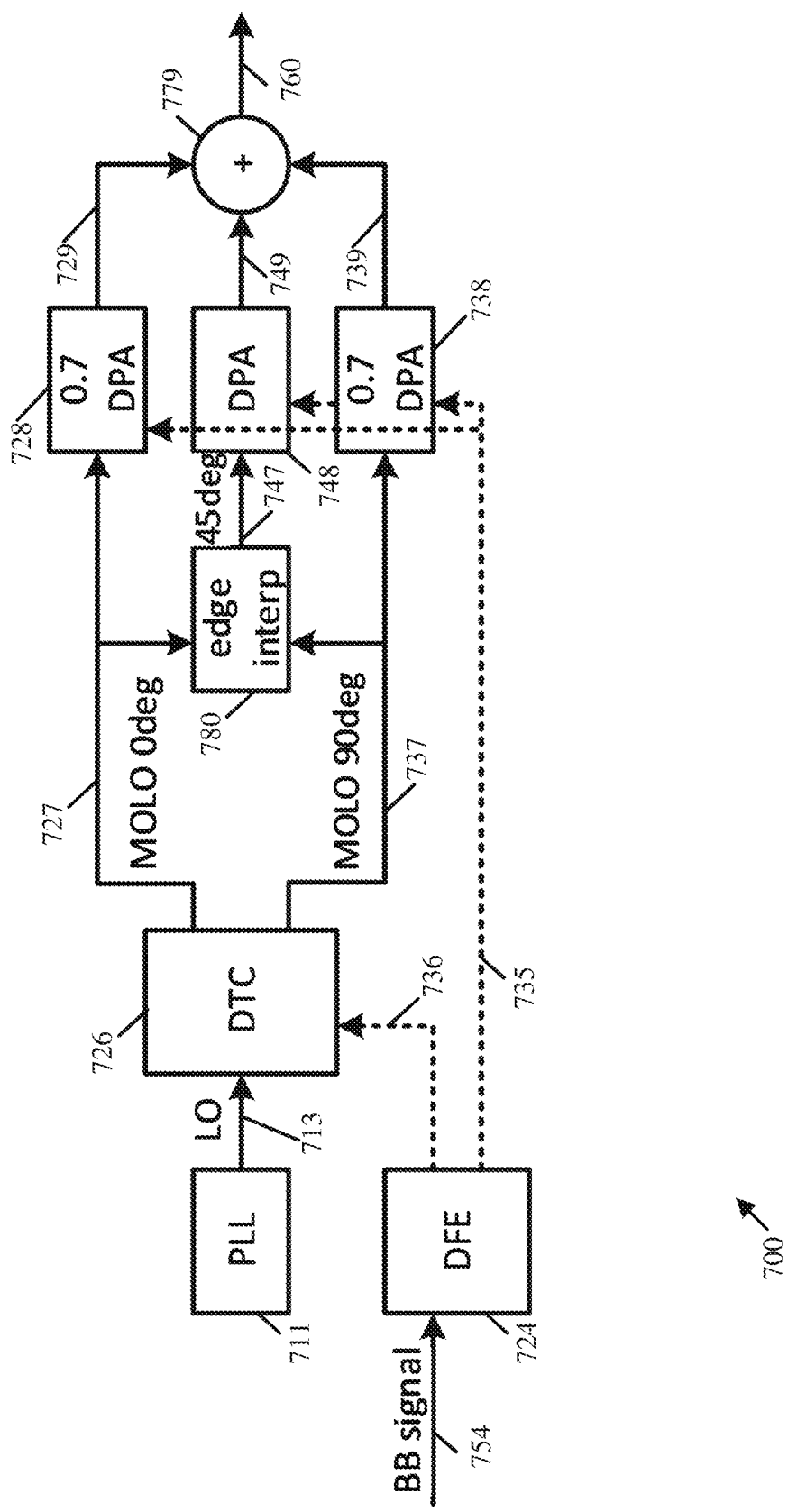
FIG. 7 is a schematic illustration of an RF Tx signal generator, in accordance with some demonstrative aspects.

Reference is made to FIG. 7, which schematically illustrates an RF Tx signal generator 700, in accordance with some demonstrative aspects. For example, RF Tx signal generator 156 (FIG. 1) may be configured to include one or more elements of RF Tx signal generator 700, and/or to perform one or more operations and/or functionalities of RF Tx signal generator 700.

In some demonstrative aspects, RF Tx signal generator 700 may be configured to generate an RF Tx signal 760 based on a baseband signal 754, e.g., as described below.

In some demonstrative aspects, RF Tx signal generator 700 may include a DTC 726 configured to generate a first MOLO signal 727 and a second MOL signal 737, for example, by modulating an LO signal 713, e.g., as described below. For example, LO signal 713 may be provided by a PLL 711.

In some demonstrative aspects, DTC 726 may be configured to generate the MOLO signal 737 having a predefined phase shift relative to the MOLO signal 727, e.g., as described below.

In some demonstrative aspects, DTC 726 may be configured to generate the MOLO signal 737 having a phase shift of about 90 degrees relative to the MOLO signal 727.

In other aspects, DTC 726 may be configured to generate the MOLO signal 737 having any other predefined phase shift relative to the MOLO signal 727.

In some demonstrative aspects, RF Tx signal generator 700 may be configured to generate a third MOLO signal 747, for example, based on MOLO signals 727 and 737, e.g., as described below.

In some demonstrative aspects, RF Tx signal generator 700 may include an interpolator 780 configured to generate the MOLO signal 747 including an interpolated MOLO signal 747, for example, based on an interpolation of MOLO signals 727 and 737.

In some demonstrative aspects, interpolator 780 may include an edge interpolator configured to generate MOLO signal 747 based, for example, on an edge interpolation of the MOLO signal 727 and the MOL signal 737.

In some demonstrative aspects, RF Tx signal generator 700 may include one or more DPAs to generate a first wideband RF signal 726, for example, by modulating an amplitude of the first MOLO signal 727; to generate a second wideband RF signal 739, for example, by modulating an amplitude of the second MOLO signal 737; and/or to generate a third wideband RF signal 749, for example, by modulating an amplitude of the interpolated MOLO signal 747.

In some demonstrative aspects, as shown in FIG. 7, RF Tx signal generator 700 may include a DPA 728 to generate the first wideband RF signal 726, for example, by modulating an amplitude of the first MOLO signal 727.

In some demonstrative aspects, as shown in FIG. 7, RF Tx signal generator 700 may include a DPA 738 to generate the second wideband RF signal 739, for example, by modulating an amplitude of the second MOLO signal 737.

In some demonstrative aspects, as shown in FIG. 7, RF Tx signal generator 700 may include a DPA 748 to generate the third wideband RF signal 749, for example, by modulating an amplitude of the interpolated MOLO signal 747.

In other aspects, RF Tx signal generator 700 may include a single DPA or any other count of DPAs, which may be configured to generate the wideband RF signals 729, 739 and/or 740.

In some demonstrative aspects, RF Tx signal generator 700 may include a DFE 724, which may be configured to control the DTC 726 and/or the one or more DPAs, e.g., DPA 728, DPA 738 and/or DPA 748, for example, based on the baseband signal 754.

In some demonstrative aspects, for example, DTC may be configured to generate one or more control signals 736 to control DTC 726 to generate the MOL signal 727 and/or the MOLO signal 737, e.g., based on the baseband signal 754.

In some demonstrative aspects, for example, DTC may be configured to generate one or more control signals 735 to control DPA 728 to generate the wideband RF signal 729, to control DPA 738 to generate the wideband RF signal 739, and/or to control DPA 748 to generate the wideband RF signal 749, e.g., based on the baseband signal 754.

In some demonstrative aspects, RF Tx signal generator 700 may include a combiner 779, which may be configured to generate the wideband RF Tx signal 760 based, for example, on a combination of the first wideband RF signal 729, the second wideband RF signal 739, and the third wideband RF signal 749.

In some demonstrative aspects, combiner 779 may be configured to generate the wideband RF Tx signal 760 based, for example, on a summation of the first wideband RF signal 729, the second wideband RF signal 739, and the third wideband RF signal 749.

In other aspects, combiner 779 may be configured to generate the wideband RF Tx signal 760 based on any other combination of the first wideband RF signal 729, the second wideband RF signal 739, and the third wideband RF signal 749.

In some demonstrative aspects, as shown in FIG. 5, RF Tx signal generator 700 may be configured to generate the wideband RF Tx signal 760 based, for example, on an unfiltered PA output, e.g., the signal 729 output by DPA 728, the signal 739 output by DPA 738, and the signal 749 output by the DPA 748.

In some demonstrative aspects, as shown in FIG. 7, RF Tx signal generator 700 may be configured to generate the wideband RF Tx signal 760 including, for example, an unfiltered power-amplified Tx signal, e.g., prior to any filter mechanisms.

In some demonstrative aspects, as shown in FIG. 7, RF Tx signal generator 700 may be configured to provide a technical solution to generate the wideband RF Tx signal 760, for example, using a DTC, e.g., DTC 726, implementing a 90° interpolator to generate the MOLO signals 727 and 737 with the 90° phase difference.

In other aspects, RF Tx signal generator 700 may be configured to provide a technical solution to generate the wideband RF Tx signal 760, for example, using two DTCs, for example, a first DTC to generate the MOLO signal 727, and a second DTC to generate the MOLO signal 737 with the 90° phase difference.

In some demonstrative aspects, as shown in FIG. 7, RF Tx signal generator 700 may be configured to provide a technical solution to generate the wideband RF Tx signal 760, for example, using a DFE, for example, a single DFE, e.g., DFE 724, to calculate and/or control DTC and/or DPA commands.

In some demonstrative aspects, as shown in FIG. 7, RF Tx signal generator 700 may be configured to provide a technical solution to generate the wideband RF Tx signal 760, for example, with relatively high, e.g., close to optimal, harmonic suppression, e.g., as described below.

Figure 8:
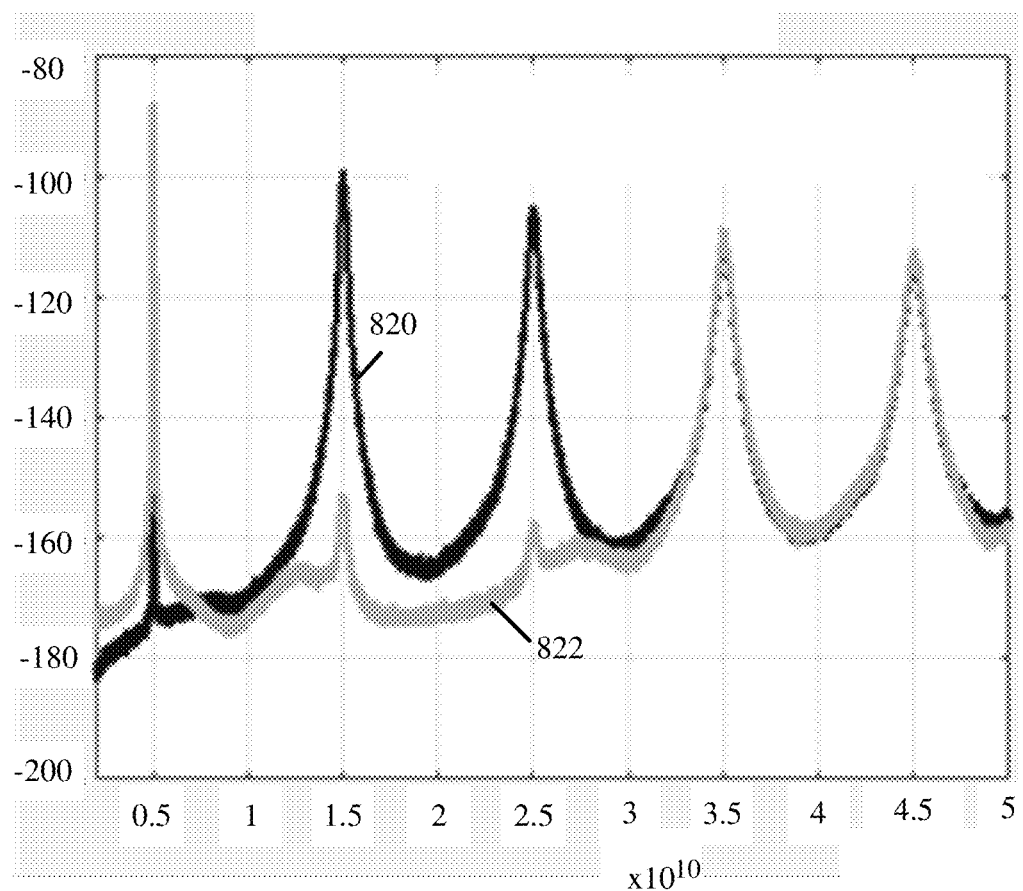
FIG. 8 is a schematic illustration of a spectrum of a modulated square-wave wideband signal and a suppressed modulated square-wave wideband signal, in accordance with some exemplary aspects.

Reference is made to FIG. 8, which illustrates a graph 800 depicting a spectrum of a modulated square-wave wideband signal 820 and a suppressed modulated square-wave wideband signal 822, in accordance with some exemplary aspects. In one example, suppressed modulated square-wave wideband signal 822 may be generated by an RF Tx signal generator, e.g., RF Tx signal generator 700 (FIG. 7), utilizing a phase-offset technique.

For example, the modulated square-wave wideband signal 820 may include a 160 MHz BW signal, e.g., at a 5 GHz central frequency, generated with a square wave; and/or the suppressed modulated square-wave wideband signal 822 may include a 160 MHz BW signal, e.g., at a 5 GHz central frequency, generated by applying a phase shift to the square wave signal, e.g., as described above.

In some demonstrative aspects, as shown in FIG. 8, the suppressed modulated square-wave wideband signal 822 may have suppressed $3^{rd}$ and $5^{th}$ harmonics, e.g., compared to the modulated square-wave wideband signal 820.

For example, as shown in FIG. 8, the $3^{rd}$ harmonic of suppressed modulated square-wave wideband signal 822 may be suppressed by about 53 dB.

For example, as shown in FIG. 8, the $5^{th}$ harmonic of suppressed modulated square-wave wideband signal 822 may be suppressed by about 51 dB.

In some demonstrative aspects, an RF Tx signal generator may be configured to provide a technical solution to generate a wideband RF Tx signal having relatively high harmonic suppression, e.g., of the $3^{rd}$ harmonic and/or the $5^{th}$ harmonic, for example, while maintaining an acceptable EVM, e.g., without EVM degradation or with minor and/or limited EVM degradation.

For example, the following tables include a comparison between simulated results corresponding to an implementation utilizing a RF Tx signal generator configured according to a time-delay technique, an implementation utilizing an RF Tx signal generator configured according to a BB phase-shift technique, and an implementation utilizing an RF Tx signal generator configured according to a MOL phase-shift technique:

TABLE 1

| | 20 MHz BW | | |
|---|---|---|---|
| | EVM [dB] | 3rd sup [dB] | 5th sup [dB] |
| Time delay | −67 | −62 | −55 |
| BB Phase shift | −93 | −64 | −55 |
| MOLO edge interp. | −70 | −64 | −55 |

TABLE 2

| | 80 MHz BW | | |
|---|---|---|---|
| | EVM [dB] | 3rd sup [dB] | 5th sup [dB] |
| Time delay | −55 | −49 | −46 |
| BB Phase shift | −92 | −64 | −55 |
| MOLO edge interp. | −59 | −58 | −55 |

TABLE 3

| | 160 MHz BW | | |
|---|---|---|---|
| | EVM [dB] | 3rd sup [dB] | 5th sup [dB] |
| Time delay | −49 | −43 | −39 |
| BB Phase shift | −82 | −64 | −54 |
| MOLO edge interp. | −53 | −53 | −51 |

TABLE 4

| | 320 MHz BW | | |
|---|---|---|---|
| | EVM [dB] | 3rd sup [dB] | 5th sup [dB] |
| Time delay | −43 | −37 | −33 |
| BB Phase shift | −71 | −64 | −45 |
| MOLO edge interp. | −46 | −46 | −46 |

In some demonstrative aspects, the implementation utilizing the RF Tx signal generator configured according to the time-delay technique may include, for example, an implementation of RF Tx signal generator 300 (FIG. 3).

In some demonstrative aspects, the implementation utilizing the RF Tx signal generator configured according to the BB phase-shift technique may include, for example, an implementation of RF Tx signal generator 500 (FIG. 5).

In some demonstrative aspects, the implementation utilizing the RF Tx signal generator configured according to the MOL phase-shift technique may include, for example, an implementation of RF Tx signal generator 700 (FIG. 7).

In some demonstrative aspects, the simulation results of Table 1 may correspond to a narrowband RF Tx signal with a 20 MHz width, the simulation results of Table 2 may correspond to a wideband RF Tx signal with a 80 MHz width, the simulation results of Table 3 may correspond to a wideband RF Tx signal with a 160 MHz width, and the simulation results of Table 4 may correspond to a wideband RF Tx signal with a 320 MHz width.

In some demonstrative aspects, per the simulation results of Table 1, each of the time-delay technique, the BB phase-shift technique, and the MOL phase-shift technique may be implemented to provide sufficient results for the narrow BW 20 MHZ signal, e.g., in terms of EVM and/or harmonic suppression.

In some demonstrative aspects, per the simulation results of Tables 2, 3, and 4, the BB phase-shift technique and the MOL phase-shift technique may be implemented to provide sufficient results for the wide BW 80 MHZ, 160 MHZ, and 320 MHZ signals, e.g., in terms of EVM and/or harmonic suppression. These results for the BB phase-shift technique and the MOL phase-shift technique may be improved, for example, with respect to the results of the time-delay technique, which may suffer from degraded EVM and harmonic suppression with respect to the wide BW signals.

For example, according to Tables 1 and 3, the BB phase-shift technique may be implemented to provide a suppressed RF Tx signal with an EVM of −93 dB for the 20 MHz BW, and to provide a suppressed RF Tx signal with an EVM of −82 dB for the 160 MHz BW.

For example, according to Tables 1 and 3, the MOL phase-shift technique may be implemented to provide a suppressed RF Tx signal with an EVM of −70 dB for the 20 MHz BW, and to provide a suppressed RF Tx signal with an EVM of −53 dB for the 160 MHz BW.

In some demonstrative aspects, per the simulation results of Tables 2, 3, and 4, the BB phase-shift technique and the MOL phase-shift technique may be implemented to provide a technical solution to generate a wideband RF Tx signal having a wide bandwidth of at least 80 MHz with a suppressed third harmonic and/or a suppressed fifth harmonic having a suppression of at least [50-3*$\log_2$(BW/80)] decibel (dB) relative to the carrier of the wideband RF Tx signal.

In some demonstrative aspects, per the simulation results of Tables 2, 3, and 4, the BB phase-shift technique and the MOL phase-shift technique may be implemented to provide a technical solution to generate a wideband RF Tx signal having a wide bandwidth of at least 80 MHz with a suppressed third harmonic and/or a suppressed fifth harmonic having a suppression of at least [53-3*$\log_2$(BW/80)] dB relative to the carrier of the wideband RF Tx signal.

In some demonstrative aspects, per the simulation results of Tables 2, 3, and 4, the BB phase-shift technique and the MOL phase-shift technique may be implemented to provide a technical solution to generate a wideband RF Tx signal having a wide bandwidth of at least 80 MHz with a suppressed third harmonic and/or a suppressed fifth harmonic having a suppression of at least [55-3*$\log_2$(BW/80)] dB relative to the carrier of the wideband RF Tx signal.

Figure 9:
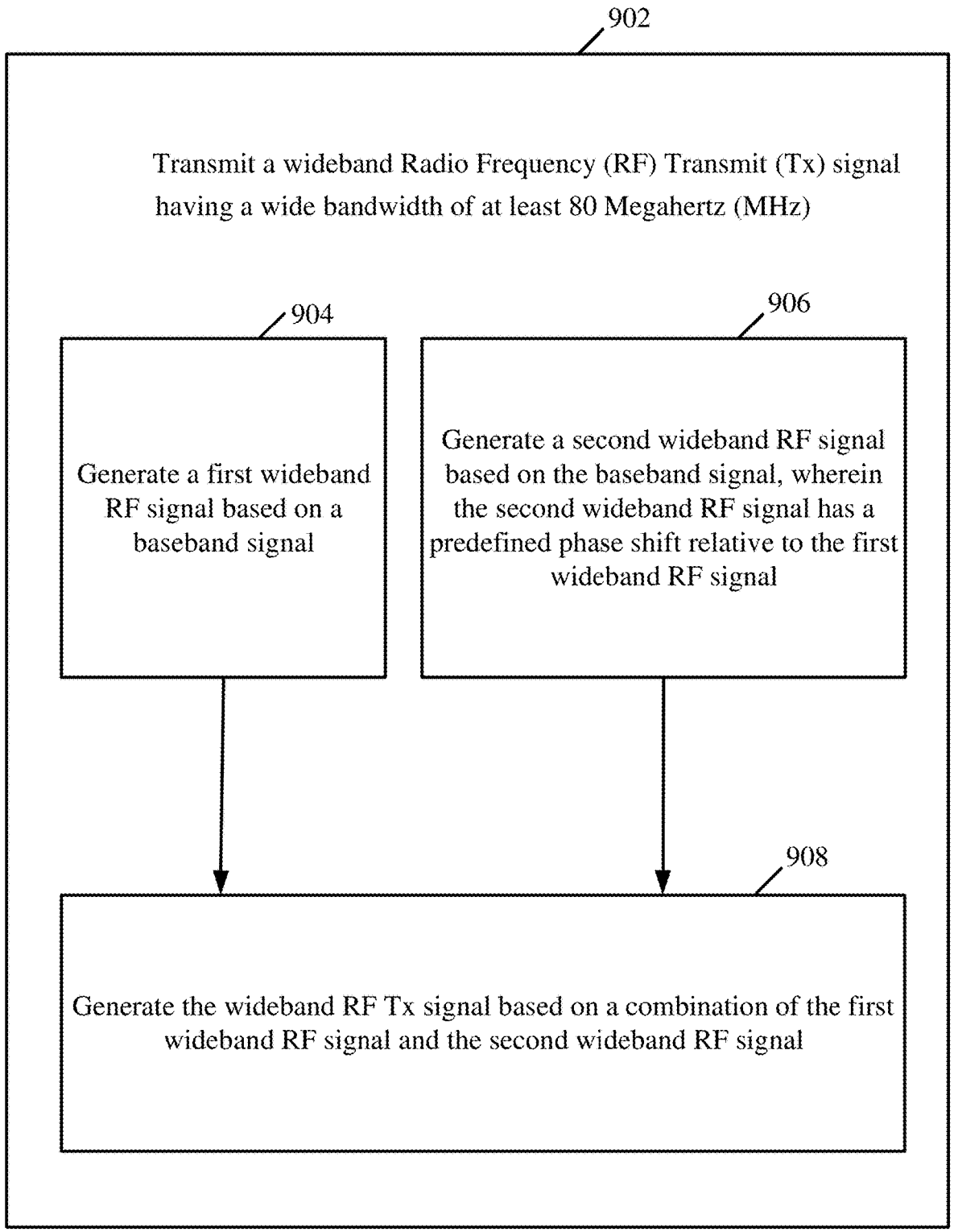
FIG. 9 is a schematic flow-chart illustration of a method of transmitting a wideband RF Tx signal, in accordance with some demonstrative aspects.

Reference is made to FIG. 9, which schematically illustrates a method of transmitting a wideband RF Tx signal, in accordance with some exemplary aspects. For example, one or more operations of the method of FIG. 9 may be performed by one or more elements of a system, e.g., system 100 (FIG. 1), for example, a wireless device, e.g., device 102 (FIG. 1), a radio, e.g., radio 114 (FIG. 1), a transmitter, e.g., transmitter 118 (FIG. 1), and/or an RF Tx signal generator, e.g., RF Tx signal generator 156 (FIG. 1).

As indicated at block 902, the method may include transmitting a wideband RF Tx signal having a wide bandwidth of at least 80 MHz. For example, transmitter 118 (FIG. 1) may be configured to transmit the wideband RF Tx signal 160 (FIG. 1) having the wide bandwidth of at least 80 MHz, e.g., as described above.

As indicated at block 904, the method may include generating a first wideband RF signal based on a baseband signal. For example, RF Tx signal generator 156 (FIG. 1) may be configured to generate the first wideband RF signal based on the baseband signal 154 (FIG. 1), e.g., as described above.

As indicated at block 906, the method may include generating a second wideband RF signal based on the baseband signal, wherein the second wideband RF signal has a predefined phase shift relative to the first wideband RF signal. For example, RF Tx signal generator 156 (FIG. 1) may be configured to generate the second wideband RF signal based on the baseband signal 154 (FIG. 1), e.g., as described above.

As indicated at block 908, the method may include generating the wideband RF Tx signal based on a combination of the first wideband RF signal and the second wideband RF signal. For example, RF Tx signal generator 156 (FIG. 1) may be configured to generate wideband RF Tx signal 160 (FIG. 1), for example, based on the combination of the first wideband RF signal and the second wideband RF signal, e.g., as described above.

Figure 10:
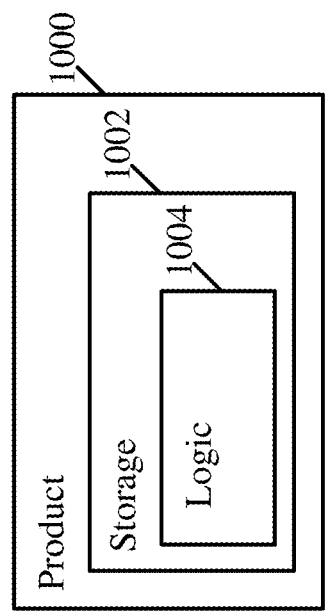
FIG. 10 is a schematic illustration of a product of manufacture, in accordance with some exemplary aspects.

Reference is made to FIG. 10, which schematically illustrates a product of manufacture 1000, in accordance with some exemplary aspects. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), a radio, e.g., radio 114 (FIG. 1), a transmitter, e.g., transmitter 118 (FIG. 1), and/or an RF Tx signal generator, e.g., RF Tx signal generator 156 (FIG. 1), RF Tx signal generator 300 (FIG. 3), RF Tx signal generator 500 (FIG. 5), and/or RF Tx signal generator 700 (FIG. 7); to cause device 102 (FIG. 1), a radio, e.g., radio 114 (FIG. 1), a transmitter, e.g., transmitter 118 (FIG. 1), and/or an RF Tx signal generator, e.g., RF Tx signal generator 156 (FIG. 1), RF Tx signal generator 300 (FIG. 3), RF Tx signal generator 500 (FIG. 5), and/or RF Tx signal generator 700 (FIG. 7) to perform, trigger and/or implement one or more operations and/or functionalities; and/or to perform, trigger and/or implement one or more operations and/or functionalities described with reference to the FIGS. 1, 2, 3, 4, 5, 6, 7, 8 and/or 9, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 1000 and/or machine-readable storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a Solid State Drive (SSD), and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1004 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language.

EXAMPLES

The following examples pertain to further aspects.

Example 1 includes an apparatus comprising a transmitter configured to transmit a wideband Radio Frequency (RF) Transmit (Tx) signal having a wide bandwidth of at least 80 Megahertz (MHz), the transmitter comprising an input to input a baseband signal; an RF Tx signal generator to generate the wideband RF Tx signal having the wide bandwidth based on the baseband signal, the RF Tx signal generator configured to generate the wideband RF Tx signal comprising a suppressed third harmonic and a suppressed fifth harmonic, wherein the suppressed third harmonic and the suppressed fifth harmonic have a suppression of at least $[50-3*\log_2(BW/80)]$ decibel (dB) relative to a carrier of the wideband RF Tx signal, wherein BW denotes the wide bandwidth in units of MHz; and an output to output the wideband RF Tx signal.

Example 2 includes the subject matter of Example 1, and optionally, wherein the RF Tx signal generator is configured to generate a first wideband RF signal based on the baseband signal, and a second wideband RF signal based on the baseband signal, wherein the second wideband RF signal has a predefined phase shift relative to the first wideband RF signal, wherein the RF Tx signal generator is configured to generate the wideband RF Tx signal based on a combination of the first wideband RF signal and the second wideband RF signal.

Example 3 includes the subject matter of Example 2, and optionally, wherein the RF Tx signal generator is configured to generate a third wideband RF signal based on the baseband signal, and to generate the wideband RF Tx signal based on a combination of the first wideband RF signal, the second wideband RF signal, and the third wideband RF signal.

Example 4 includes the subject matter of Example 3, and optionally, wherein the RF Tx signal generator comprises a first phase shifter to generate a first phase-shifted baseband signal by applying a first phase shift to the baseband signal; a second phase shifter to generate a second phase-shifted baseband signal by applying a second phase shift to the baseband signal; a first Digital Transmit (DTx) chain to generate the first wideband RF signal based on a Local Oscillator (LO) signal and the first phase-shifted baseband signal; a second DTx chain to generate the second wideband RF signal based on the LO signal and the second phase-shifted baseband signal; a third DTx chain to generate the third wideband RF signal based on the LO signal and the baseband signal; and a combiner to generate the wideband RF Tx signal based on a combination of the first wideband RF signal, the second wideband RF signal, and the third wideband RF signal.

Example 5 includes the subject matter of Example 4, and optionally, wherein at least one particular DTx chain of the first DTx chain, the second DTx chain, or the third DTx chain comprises a Digital Front End (DFE) to generate a first control signal and a second control signal based on a particular baseband signal applied to the particular DTx chain; a Digital Time Converter (DTC) to generate a Modulated LO (MOLO) signal by modulating a phase of the LO signal based on the first control signal; and a Digital Power Amplifier (DPA) to generate a particular wideband RF signal corresponding to the particular baseband signal by modulating an amplitude of the MOLO signal based on the second control signal.

Example 6 includes the subject matter of Example 4 or 5, and optionally, wherein the first phase shift is in a range of 44-46 degrees, and the second phase shift is in a range of (−46)-(−44) degrees.

Example 7 includes the subject matter of Example 2, and optionally, wherein the RF Tx signal generator is configured to generate a first Modulated Local Oscillator (MOLO) signal and a second MOLO signal by modulating a Local Oscillator (LO) signal based on the baseband signal, to generate the first wideband RF signal based on the first MOLO signal, to generate the second wideband RF signal based on the second MOLO signal, to generate a third wideband RF signal based on the first and second MOLO signals, and to generate the wideband RF Tx signal based on a combination of the first wideband RF signal, the second wideband RF signal, and the third wideband RF signal, wherein the second MOLO signal has the predefined phase shift relative to the first MOLO signal.

Example 8 includes the subject matter of Example 7, and optionally, wherein the RF Tx signal generator comprises a Digital Time Converter (DTC) to generate the first and second MOLO signals by modulating the LO signal; an interpolator to generate an interpolated MOLO signal based on an interpolation of the first and second MOLO signals; one or more Digital Power Amplifiers (DPAs) to generate the first wideband RF signal by modulating an amplitude of the first MOLO signal, to generate the second wideband RF signal by modulating an amplitude of the second MOLO signal, and to generate the third wideband RF signal by modulating an amplitude of the interpolated MOLO signal; and a Digital Front End (DFE) to control the DTC and the one or more DPAs based on the baseband signal.

Example 9 includes the subject matter of Example 7 or 8, and optionally, wherein the third wideband RF signal is based on an edge interpolation of the first and second MOLO signals.

Example 10 includes the subject matter of any one of Example 2-9, and optionally, wherein the second wideband RF signal has a phase shift of 90 degrees relative to the first wideband RF signal.

Example 11 includes the subject matter of any one of Examples 1-10, and optionally, wherein the RF Tx signal generator is configured to generate the wideband RF Tx signal based on an unfiltered Power Amplifier (PA) output.

Example 12 includes the subject matter of any one of Examples 1-11, and optionally, wherein the RF Tx signal generator is configured to generate the wideband RF Tx signal comprising an unfiltered power-amplified Tx signal.

Example 13 includes the subject matter of any one of Examples 1-12, and optionally, wherein the suppressed third harmonic has a suppression of at least $[53-3*\log_2(BW/80)]$ dB relative to the carrier of the wideband RF Tx signal Example 14 includes the subject matter of any one of Examples 1-13, and optionally, wherein the suppressed third harmonic has a suppression of at least $[55-3*\log_2(BW/80)]$ dB relative to the carrier of the wideband RF Tx signal.

Example 15 includes the subject matter of any one of Examples 1-14, and optionally, wherein the wideband RF Tx signal has a bandwidth of at least 160 MHz.

Example 16 includes the subject matter of any one of Examples 1-15, and optionally, wherein the wideband RF Tx signal has a bandwidth of at least 320 MHz.

Example 17 includes the subject matter of any one of Examples 1-16, and optionally, comprising an antenna to transmit the wideband RF Tx signal.

Example 18 includes an apparatus comprising a transmitter configured to transmit a wideband Radio Frequency (RF) Transmit (Tx) signal having a wide bandwidth of at least 80 Megahertz (MHz), the transmitter comprising an input to input a baseband signal; an RF Tx signal generator to generate a first wideband RF signal based on the baseband signal, and to generate a second wideband RF signal based on the baseband signal, wherein the second wideband RF signal has a predefined phase shift relative to the first wideband RF signal, wherein the RF Tx signal generator is configured to generate the wideband RF Tx signal based on a combination of the first wideband RF signal and the second wideband RF signal; and an output to output the wideband RF Tx signal.

Example 19 includes the subject matter of Example 18, and optionally, wherein the RF Tx signal generator is configured to generate a third wideband RF signal based on the baseband signal, and to generate the wideband RF Tx signal based on a combination of the first wideband RF signal, the second wideband RF signal, and the third wideband RF signal.

Example 20 includes the subject matter of Example 19, and optionally, wherein the RF Tx signal generator comprises a first phase shifter to generate a first phase-shifted baseband signal by applying a first phase shift to the baseband signal; a second phase shifter to generate a second phase-shifted baseband signal by applying a second phase shift to the baseband signal; a first Digital Transmit (DTx) chain to generate the first wideband RF signal based on a Local Oscillator (LO) signal and the first phase-shifted baseband signal; a second DTx chain to generate the second wideband RF signal based on the LO signal and the second phase-shifted baseband signal; a third DTx chain to generate the third wideband RF signal based on the LO signal and the baseband signal; and a combiner to generate the wideband RF Tx signal based on a combination of the first wideband RF signal, the second wideband RF signal, and the third wideband RF signal.

Example 21 includes the subject matter of Example 20, and optionally, wherein at least one particular DTx chain of the first DTx chain, the second DTx chain, or the third DTx chain comprises a Digital Front End (DFE) to generate a first control signal and a second control signal based on a particular baseband signal applied to the particular DTx chain; a Digital Time Converter (DTC) to generate a Modulated LO (MOLO) signal by modulating a phase of the LO signal based on the first control signal; and a Digital Power Amplifier (DPA) to generate a particular wideband RF signal corresponding to the particular baseband signal by modulating an amplitude of the MOLO signal based on the second control signal.

Example 22 includes the subject matter of Example 20 or 21, and optionally, wherein the first phase shift is in a range of 44-46 degrees, and the second phase shift is in a range of (−46)-(−44) degrees.

Example 23 includes the subject matter of Example 18, and optionally, wherein the RF Tx signal generator is configured to generate a first Modulated Local Oscillator (MOLO) signal and a second MOLO signal by modulating a Local Oscillator (LO) signal based on the baseband signal, to generate the first wideband RF signal based on the first MOLO signal, to generate the second wideband RF signal based on the second MOLO signal, to generate a third wideband RF signal based on the first and second MOLO signals, and to generate the wideband RF Tx signal based on a combination of the first wideband RF signal, the second wideband RF signal, and the third wideband RF signal, wherein the second MOLO signal has the predefined phase shift relative to the first MOLO signal.

Example 24 includes the subject matter of Example 23, and optionally, wherein the RF Tx signal generator comprises a Digital Time Converter (DTC) to generate the first and second MOLO signals by modulating the LO signal; an interpolator to generate an interpolated MOLO signal based on an interpolation of the first and second MOLO signals; one or more Digital Power Amplifiers (DPAs) to generate the first wideband RF signal by modulating an amplitude of the first MOLO signal, to generate the second wideband RF signal by modulating an amplitude of the second MOLO signal, and to generate the third wideband RF signal by modulating an amplitude of the interpolated MOLO signal; and a Digital Front End (DFE) to control the DTC and the one or more DPAs based on the baseband signal.

Example 25 includes the subject matter of Example 23 or 24, and optionally, wherein the third wideband RF signal is based on an edge interpolation of the first and second MOLO signals.

Example 26 includes the subject matter of any one of Example 18-25, and optionally, wherein the second wideband RF signal has a phase shift of 90 degrees relative to the first wideband RF signal.

Example 27 includes the subject matter of any one of Examples 18-26, and optionally, wherein the RF Tx signal generator is configured to generate the wideband RF Tx signal based on an unfiltered Power Amplifier (PA) output.

Example 28 includes the subject matter of any one of Examples 18-27, and optionally, wherein the RF Tx signal generator is configured to generate the wideband RF Tx signal comprising an unfiltered power-amplified Tx signal.

Example 29 includes the subject matter of any one of Examples 18-28, and optionally, wherein the wideband RF Tx signal has a bandwidth of at least 160 MHz.

Example 30 includes the subject matter of any one of Examples 18-28, and optionally, wherein the wideband RF Tx signal has a bandwidth of at least 320 MHz.

Example 31 includes the subject matter of any one of Examples 18-30, and optionally, comprising an antenna to transmit the wideband RF Tx signal.

Example 32 comprises a wireless communication device comprising the apparatus of any one of Examples 1-31.

Example 33 comprises an apparatus comprising means for executing any of the described operations of Examples 1-31.

Example 34 comprises a product comprising one or more tangible computer-readable non-transitory storage media comprising computer-executable instructions operable to, when executed by at least one processor, enable the at least one processor to cause a device to perform any of the described operations of Examples 1-31.

Example 35 comprises an apparatus comprising: a memory interface; and processing circuitry configured to: perform any of the described operations of Examples 1-31.

Example 36 comprises a method comprising any of the described operations of Examples 1-31.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a transmitter configured to transmit a wideband Radio Frequency (RF) Transmit (Tx) signal having a wide bandwidth of at least 80 Megahertz (MHz), the transmitter comprising:
an input to input a baseband signal;
an RF Tx signal generator to generate the wideband RF Tx signal having the wide bandwidth based on the baseband signal, the RF Tx signal generator configured to generate the wideband RF Tx signal comprising a suppressed third harmonic and a suppressed fifth harmonic, wherein the suppressed third harmonic and the suppressed fifth harmonic have a suppression of at least $[50-3*\log_2(BW/80)]$ decibel (dB) relative to a carrier of the wideband RF Tx signal, wherein BW denotes the wide bandwidth in units of MHz; and
an output to output the wideband RF Tx signal.

2. The apparatus of claim 1, wherein the RF Tx signal generator is configured to generate a first wideband RF signal based on the baseband signal, and a second wideband RF signal based on the baseband signal, wherein the second wideband RF signal has a predefined phase shift relative to the first wideband RF signal, wherein the RF Tx signal generator is configured to generate the wideband RF Tx signal based on a combination of the first wideband RF signal and the second wideband RF signal.

3. The apparatus of claim 2, wherein the RF Tx signal generator is configured to generate a third wideband RF signal based on the baseband signal, and to generate the wideband RF Tx signal based on a combination of the first wideband RF signal, the second wideband RF signal, and the third wideband RF signal.

4. The apparatus of claim 3, wherein the RF Tx signal generator comprises:
a first phase shifter to generate a first phase-shifted baseband signal by applying a first phase shift to the baseband signal;
a second phase shifter to generate a second phase-shifted baseband signal by applying a second phase shift to the baseband signal;
a first Digital Transmit (DTx) chain to generate the first wideband RF signal based on a Local Oscillator (LO) signal and the first phase-shifted baseband signal;
a second DTx chain to generate the second wideband RF signal based on the LO signal and the second phase-shifted baseband signal;
a third DTx chain to generate the third wideband RF signal based on the LO signal and the baseband signal; and
a combiner to generate the wideband RF Tx signal based on a combination of the first wideband RF signal, the second wideband RF signal, and the third wideband RF signal.

5. The apparatus of claim 4, wherein at least one particular DTx chain of the first DTx chain, the second DTx chain, or the third DTx chain comprises:
a Digital Front End (DFE) to generate a first control signal and a second control signal based on a particular baseband signal applied to the particular DTx chain;
a Digital Time Converter (DTC) to generate a Modulated LO (MOLO) signal by modulating a phase of the LO signal based on the first control signal; and
a Digital Power Amplifier (DPA) to generate a particular wideband RF signal corresponding to the particular baseband signal by modulating an amplitude of the MOLO signal based on the second control signal.

6. The apparatus of claim 4, wherein the first phase shift is in a range of 44-46 degrees, and the second phase shift is in a range of (−46)-(−44) degrees.

7. The apparatus of claim 2, wherein the RF Tx signal generator is configured to generate a first Modulated Local Oscillator (MOLO) signal and a second MOLO signal by modulating a Local Oscillator (LO) signal based on the baseband signal, to generate the first wideband RF signal based on the first MOLO signal, to generate the second wideband RF signal based on the second MOLO signal, to generate a third wideband RF signal based on the first and second MOLO signals, and to generate the wideband RF Tx signal based on a combination of the first wideband RF signal, the second wideband RF signal, and the third wideband RF signal, wherein the second MOLO signal has the predefined phase shift relative to the first MOLO signal.

8. The apparatus of claim 7, wherein the RF Tx signal generator comprises:
a Digital Time Converter (DTC) to generate the first and second MOLO signals by modulating the LO signal;
an interpolator to generate an interpolated MOLO signal based on an interpolation of the first and second MOLO signals;
one or more Digital Power Amplifiers (DPAs) to generate the first wideband RF signal by modulating an amplitude of the first MOLO signal, to generate the second wideband RF signal by modulating an amplitude of the second MOLO signal, and to generate the third wideband RF signal by modulating an amplitude of the interpolated MOLO signal; and
a Digital Front End (DFE) to control the DTC and the one or more DPAs based on the baseband signal.

9. The apparatus of claim 7, wherein the third wideband RF signal is based on an edge interpolation of the first and second MOLO signals.

10. The apparatus of claim 2, wherein the second wideband RF signal has a phase shift of 90 degrees relative to the first wideband RF signal.

11. The apparatus of claim 1, wherein the RF Tx signal generator is configured to generate the wideband RF Tx signal based on an unfiltered Power Amplifier (PA) output.

12. The apparatus of claim 1, wherein the RF Tx signal generator is configured to generate the wideband RF Tx signal comprising an unfiltered power-amplified Tx signal.

13. The apparatus of claim 1, wherein the suppressed third harmonic has a suppression of at least $[53-3*\log_2(BW/80)]$ dB relative to the carrier of the wideband RF Tx signal.

14. The apparatus of claim 1, wherein the suppressed third harmonic has a suppression of at least $[55-3*\log_2(BW/80)]$ dB relative to the carrier of the wideband RF Tx signal.

15. The apparatus of claim 1, wherein the wideband RF Tx signal has a bandwidth of at least 160 MHz.

16. The apparatus of claim 1, wherein the wideband RF Tx signal has a bandwidth of at least 320 MHz.

17. The apparatus of claim 1 comprising an antenna to transmit the wideband RF Tx signal.

18. An apparatus comprising:
a transmitter configured to transmit a wideband Radio Frequency (RF) Transmit (Tx) signal having a wide bandwidth of at least 80 Megahertz (MHz), the transmitter comprising:
an input to input a baseband signal;
an RF Tx signal generator to generate a first wideband RF signal based on the baseband signal, to generate a second wideband RF signal based on the baseband signal, and to generate a third wideband RF signal based on the baseband signal, wherein the second wideband RF signal has a predefined phase shift relative to the first wideband RF signal, wherein the RF Tx signal generator is configured to generate the wideband RF Tx signal based on a combination of the first wideband RF signal, the second wideband RF signal, and the third wideband RF signal, the RF Tx signal generator comprising:
a first phase shifter to generate a first phase-shifted baseband signal by applying a first phase shift to the baseband signal;
a second phase shifter to generate a second phase-shifted baseband signal by applying a second phase shift to the baseband signal;
a first Digital Transmit (DTx) chain to generate the first wideband RF signal based on a Local Oscillator (LO) signal and the first phase-shifted baseband signal;
a second DTx chain to generate the second wideband RF signal based on the LO signal and the second phase-shifted baseband signal;
a third DTx chain to generate the third wideband RF signal based on the LO signal and the baseband signal; and
a combiner to generate the wideband RF Tx signal based on the combination of the first wideband RF signal, the second wideband RF signal, and the third wideband RF signal; and
an output to output the wideband RF Tx signal.

19. The apparatus of claim 18, wherein at least one particular DTx chain of the first DTx chain, the second DTx chain, or the third DTx chain comprises:
a Digital Front End (DFE) to generate a first control signal and a second control signal based on a particular baseband signal applied to the particular DTx chain;
a Digital Time Converter (DTC) to generate a Modulated LO (MOLO) signal by modulating a phase of the LO signal based on the first control signal; and
a Digital Power Amplifier (DPA) to generate a particular wideband RF signal corresponding to the particular baseband signal by modulating an amplitude of the MOLO signal based on the second control signal.

20. The apparatus of claim 18, wherein the second wideband RF signal has a phase shift of 90 degrees relative to the first wideband RF signal.

21. The apparatus of claim 18, wherein the first phase shift is in a range of 44-46 degrees, and the second phase shift is in a range of (−46)-(−44) degrees.

22. The apparatus of claim 18, wherein the RF Tx signal generator is configured to generate the wideband RF Tx signal comprising an unfiltered power-amplified Tx signal.

23. The apparatus of claim 18 comprising a wireless communication device, wherein the wireless communication device comprises an antenna to transmit the wideband RF Tx signal, and a processor to generate information to be transmitted by the transmitter.

24. An apparatus comprising:
transmitter means for transmitting a wideband Radio Frequency (RF) Transmit (Tx) signal having a wide bandwidth of at least 80 Megahertz (MHz), the transmitter means comprising:
means for inputting a baseband signal;
RF Tx signal generator means for generating the wideband RF Tx signal having the wide bandwidth based on the baseband signal, the RF Tx signal generator means comprising means for generating the wideband RF Tx signal comprising a suppressed third harmonic and a suppressed fifth harmonic, wherein the suppressed third harmonic and the suppressed fifth harmonic have a suppression of at least $[50-3*\log_2(BW/80)]$ decibel (dB) relative to a carrier of the wideband RF Tx signal, wherein BW denotes the wide bandwidth in units of MHz.

25. The apparatus of claim 24 comprising means for generating a first wideband RF signal based on the baseband signal, and a second wideband RF signal based on the baseband signal, wherein the second wideband RF signal has a predefined phase shift relative to the first wideband RF signal, and means for generating the wideband RF Tx signal based on a combination of the first wideband RF signal and the second wideband RF signal.

\* \* \* \* \*